(12) United States Patent
Harutyunyan et al.

(10) Patent No.: US 11,294,758 B2
(45) Date of Patent: Apr. 5, 2022

(54) AUTOMATED METHODS AND SYSTEMS TO CLASSIFY AND TROUBLESHOOT PROBLEMS IN INFORMATION TECHNOLOGY SYSTEMS AND SERVICES

(71) Applicant: VMware, Inc., Palo Alto, CA (US)

(72) Inventors: Ashot Nshan Harutyunyan, Yerevan (AM); Arnak Poghosyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 682 days.

(21) Appl. No.: 15/828,133

(22) Filed: Nov. 30, 2017

(65) Prior Publication Data
US 2019/0163550 A1   May 30, 2019

(51) Int. Cl.
*G06F 11/07* (2006.01)

(52) U.S. Cl.
CPC ........ *G06F 11/0793* (2013.01); *G06F 11/076* (2013.01); *G06F 11/079* (2013.01); *G06F 11/0709* (2013.01); *G06F 11/0787* (2013.01); *G06F 2201/815* (2013.01); *G06F 2201/86* (2013.01)

(58) Field of Classification Search
CPC ............... G06F 11/079; G06F 11/0793; G06F 11/0709; G06F 11/076; G06F 11/0787
See application file for complete search history.

(56) References Cited

U.S. PATENT DOCUMENTS

| | | | | |
|---|---|---|---|---|
| 7,962,797 B2 * | 6/2011 | Goldszmidt | ........ | G06F 11/0709 714/25 |
| 8,069,370 B1 * | 11/2011 | Li | ........ | G06F 11/0709 714/26 |
| 8,078,913 B2 * | 12/2011 | Goldszmidt | ........ | G06F 11/0709 702/185 |
| 8,700,953 B2 * | 4/2014 | Kato | ........ | G06F 11/0709 714/26 |
| 10,146,609 B1 * | 12/2018 | Leverich | ........ | G06F 11/079 |
| 10,191,796 B1 * | 1/2019 | Havemose | ........ | G06F 11/079 |
| 2016/0103724 A1 * | 4/2016 | Kim | ........ | G06F 11/0751 714/37 |
| 2016/0321553 A1 * | 11/2016 | Marvasti | ........ | G06K 9/00 |
| 2017/0310542 A1 * | 10/2017 | Nair | ........ | H04L 41/22 |

* cited by examiner

*Primary Examiner* — Joseph R Kudirka

(57) ABSTRACT

Automated computational methods and systems to classify and troubleshoot problems in information technology ("IT") systems or services provided by a distributed computing system are described. Each IT system of the distribution computing system or IT service provided by the distributed computing system has an associated key performance indicator ("KPI") used to monitor performance of the IT system or service. When real-time KPI data violates a KPI threshold, a real-time event-type distribution is computed from event messages generated by event sources associated with the IT system or service following the threshold violation. The real-time event-type distribution is compared with historical event-type distributions recorded for the KPI data in order to identify the problem and execute remedial action to resolve the problem.

24 Claims, 34 Drawing Sheets

```
log.write([$Time_date] [Thread-$X/$IP/INFO]
[com.vmware.loginsight.commons.executor.ProcessExecutor] { [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 15

```
[2015-03-10 23:43:36.859+0000] [Thread-1822496/127.0.0.1 INFO]
[com.vmware.loginsight.commons.executor.ProcessExecutor] { [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 16

```
2013-12-02T10:44:24.095Z li-qe-esx5.vmware.com Rhttpproxy:
[28959B90 verbose 'Proxy Req 46691'] Connected to
localhost:8307

2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]   [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 17

$$ET_{1'} = \left\{ D_1^{1'}, D_2^{1'}, D_3^{1'}, ..., D_K^{1'} \right\}$$

$$ET_{2'} = \left\{ D_1^{2'}, D_2^{2'}, D_3^{2'}, ..., D_K^{2'} \right\}$$

$$ET_{3'} = \left\{ D_1^{3'}, D_2^{3'}, D_3^{3'}, ..., D_K^{3'} \right\}$$

$$\vdots$$

$$ET_{N'} = \left\{ D_1^{N'}, D_2^{N'}, D_3^{N'}, ..., D_K^{N'} \right\}$$

FIG. 28A

|  | $ET_{1'}$ | $ET_{2'}$ | $ET_{3'}$ | $\cdots$ | $ET_{N'}$ |
|---|---|---|---|---|---|
| $ET_{1'}$ | 0 | $Dist(ET_{2'}, ET_{1'})$ | $Dist(ET_{3'}, ET_{1'})$ | $\cdots$ | $Dist(ET_{N'}, ET_{1'})$ |
| $ET_{2'}$ | $Dist(ET_{1'}, ET_{2'})$ | 0 | $Dist(ET_{3'}, ET_{2'})$ | $\cdots$ | $Dist(ET_{N'}, ET_{2'})$ |
| $ET_{3'}$ | $Dist(ET_{1'}, ET_{3'})$ | $Dist(ET_{2'}, ET_{3'})$ | 0 | $\cdots$ | $Dist(ET_{N'}, ET_{3'})$ |
| $\vdots$ | $\vdots$ | $\vdots$ | $\vdots$ | $\vdots$ | $\vdots$ |
| $ET_{N'}$ | $Dist(ET_{1'}, ET_{N'})$ | $Dist(ET_{2'}, ET_{N'})$ | $Dist(ET_{3'}, ET_{N'})$ | $\cdots$ | 0 |
|  | $\downarrow$ | $\downarrow$ | $\downarrow$ | | $\downarrow$ |
|  | $Dist^A(ET_{1'})$ | $Dist^A(ET_{2'})$ | $Dist^A(ET_{3'})$ | $\cdots$ | $Dist^A(ET_{N'})$ |

FIG. 28B

| Aberration | Event-type distribution | Problem type | Remedial action | Critical level |
|---|---|---|---|---|
| Aberration 1 | $ET_1$ | Insufficient server computer memory allocated to VM | Instructions to increase memory allocation to VM by y | Level 3 |
| Aberration 2 | $ET_2$ | Insufficient server computer CPU allocated to VM | Instructions to increase CPU allocation to VM by z | Level 2 |
| Aberration 3 | $ET_3$ | Insufficient server computer memory | Instructions to migrate VMs to server computer | Level 1 |
| Aberration 4 | $ET_4$ | Insufficient server computer CPU | Instructions to migrate VMs to server computer | Level 1 |
| ⋮ | ⋮ | ⋮ | ⋮ | ⋮ |

FIG. 29

AUTOMATED METHODS AND SYSTEMS TO CLASSIFY AND TROUBLESHOOT PROBLEMS IN INFORMATION TECHNOLOGY SYSTEMS AND SERVICES

TECHNICAL FIELD

The present disclosure is directed to automated computational systems and methods to classify and troubleshoot problems in distributed computing systems.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

The number and size of distributed computing systems have grown to meet the increasing demand for information technology ("IT") services, such as running applications for organizations that provide business and web services to millions of customers. In order to proactively manage IT systems and services, management tools have been developed to collect and process time series metric data generated by computational resources of the distributed computing system in an effort to detect problems and generate alerts when problems arise. However, typical management tools are not able to identify the nature or cause of many types of performance problems, which leads to lost revenue for IT service providers and organizations that purchase IT services because of time wasted trying to manually determine the causes of the problems. For example, a typical management tool generates an alert when the response time of an application is too slow. As a result, system administrators are made aware of the problem when the alert is generated. However, system administrators are typically not able to timely troubleshoot the cause of a delayed response time because the causes are numerous and varied and identifying characteristics of the delayed response time are not detected by typical management tools. System administrators and IT service providers seek methods and systems that can determine the nature of problems in IT systems, enabling system administrators and IT service providers an opportunity to timely troubleshoot and correct the problems.

SUMMARY

This disclosure describes automated computational methods and systems to classify and troubleshoot problems in information technology ("IT") systems or services provided by a distributed computing system. Each IT system or service has an associated key performance indicator ("KPI") used to monitor performance of the IT system or service. When real-time KPI data violates a KPI threshold an alert is generated. The KPI threshold violation indicates a problem has occurred in performance of the IT system or service. Event messages generated by event sources associated with the IT system or service with time stamps in a time window that starts when the threshold violation occurred are identified. A real-time event-type distribution is computed from the event messages. The real-time event-type distribution is compared with historical event-type distributions recorded in a historical record of aberrations in the KPI data. The historical record comprises a history of problems, remedial actions, and associated historical event-type distributions computed from event messages generated by the same event sources in time windows associated with each historical KPI threshold violation. The problem type of a historical event-type distribution closest to the real-time event-type distribution is assigned to the real-time event-type distribution. Remedial action is taken to resolve the problem based on the problem type assigned to the real-time event-type distribution.

DESCRIPTION OF THE DRAWINGS

FIG. 15 shows an example of a log write instruction.

FIG. 16 shows an example of an event message generated by a log write instruction.

FIG. 17 shows a small, eight-entry portion of an event log.

FIG. 28A shows a list of event-type distributions.

FIG. 28B shows a matrix of distances computed between event-type distributions displayed in FIG. 28A.

FIG. 29 shows examples of problem types and corresponding remedial actions.

DETAILED DESCRIPTION

Figure 1:
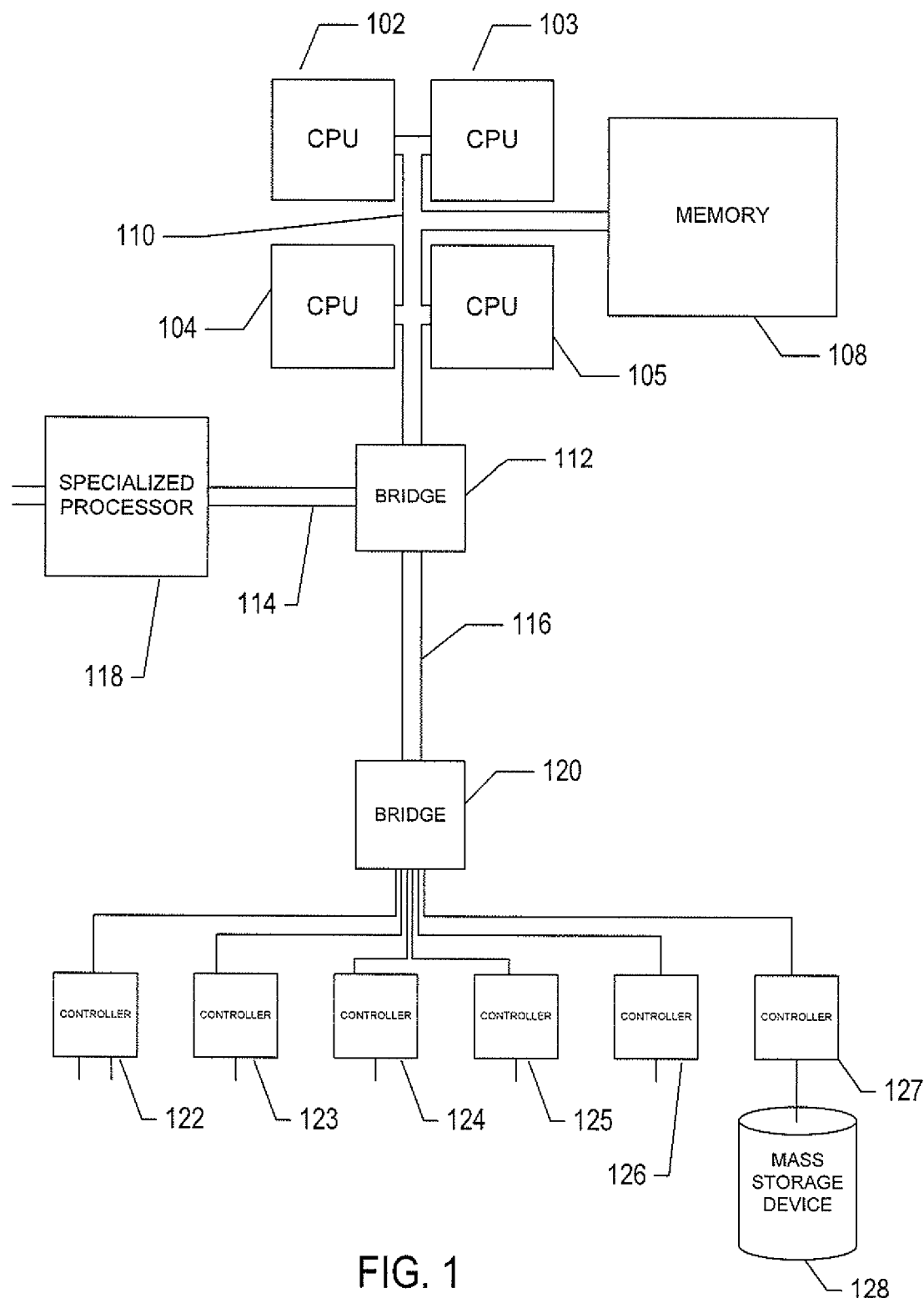
FIG. 1 shows a general architectural diagram for various types of computers.

This disclosure presents automated computational methods and systems to classify and troubleshoot problems in information technology ("IT") systems or services provided by a distributed computing system. In a first subsection, computer hardware, complex computational systems, and virtualization are described. Containers and containers supported by virtualization layers are described in a second subsection. Logging event messages in event logs is described in a third subsection. Methods to classify and troubleshoot problems in IT systems or services are described in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
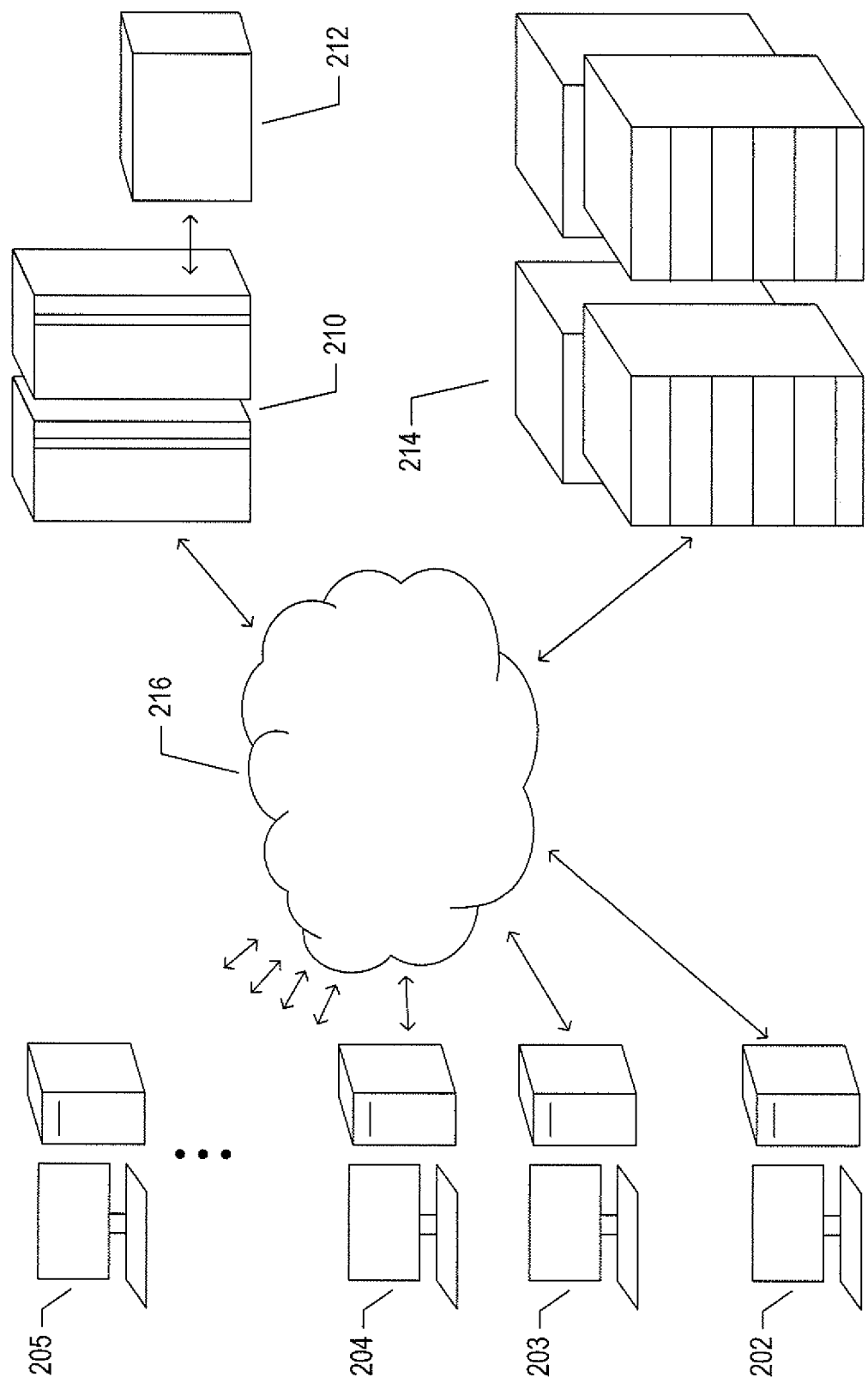
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
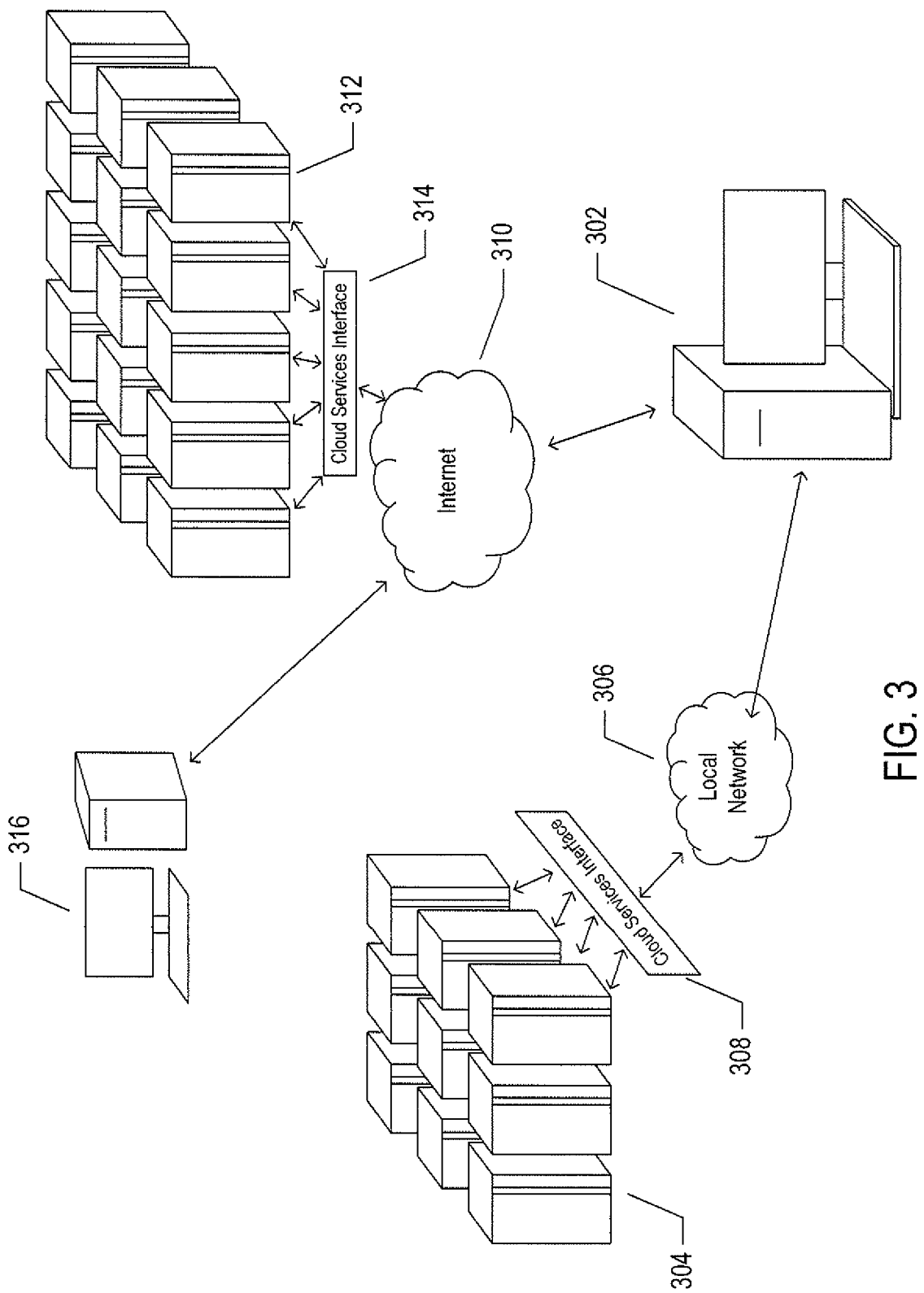
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and data-base-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
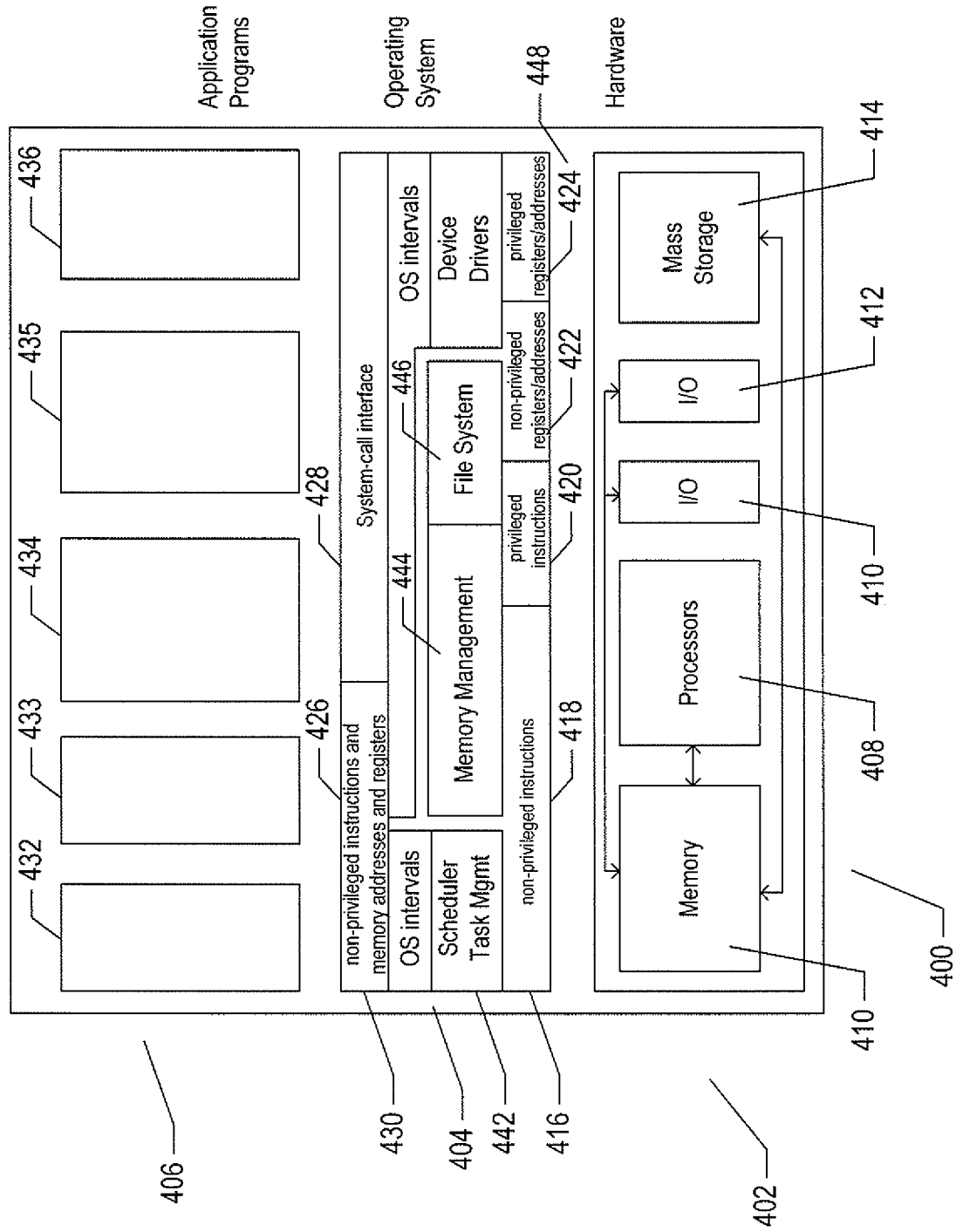
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
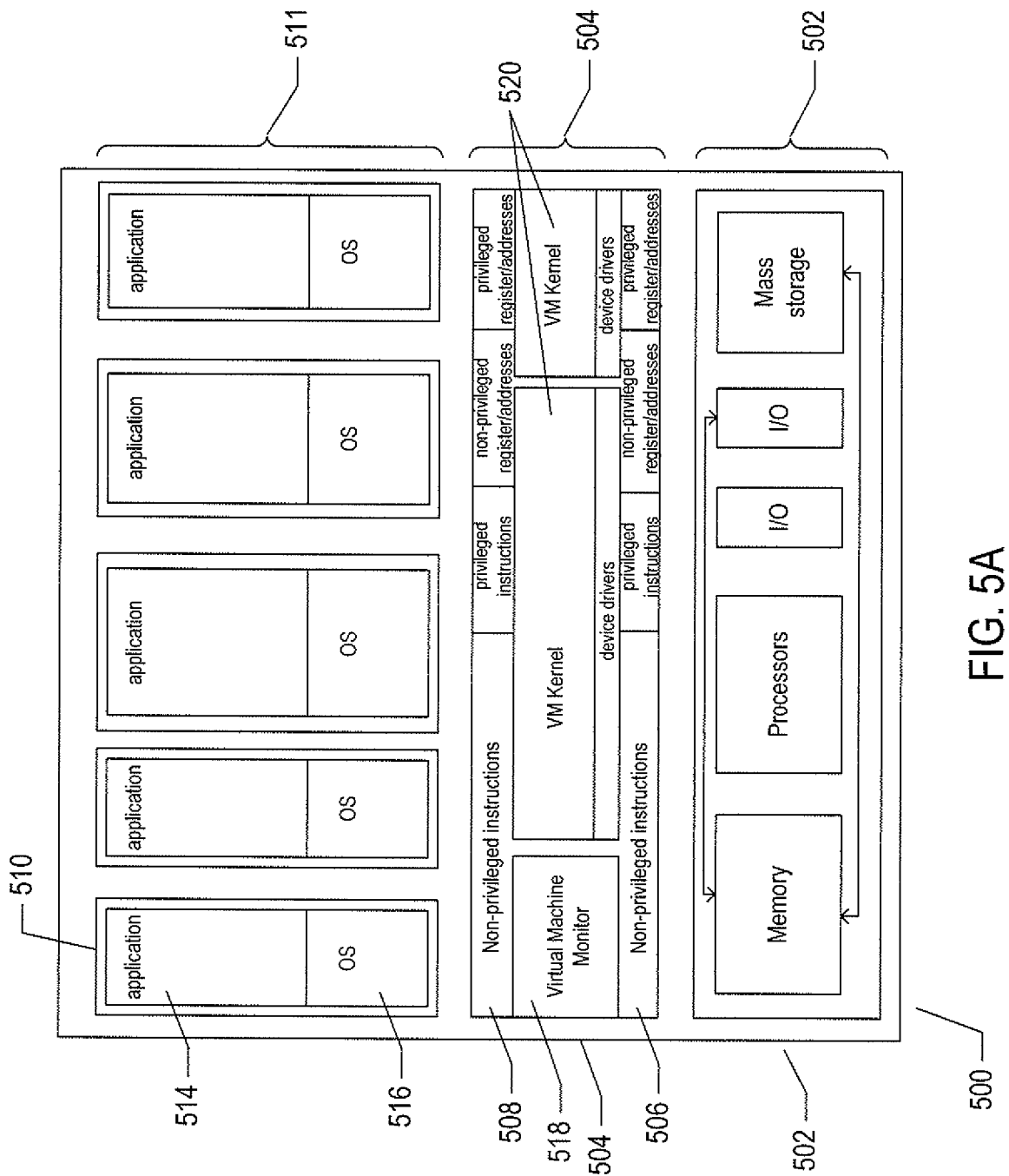
FIGS. 5A-5B show two types of virtual machine ("VM") and VM execution environments.
Figure 5B:
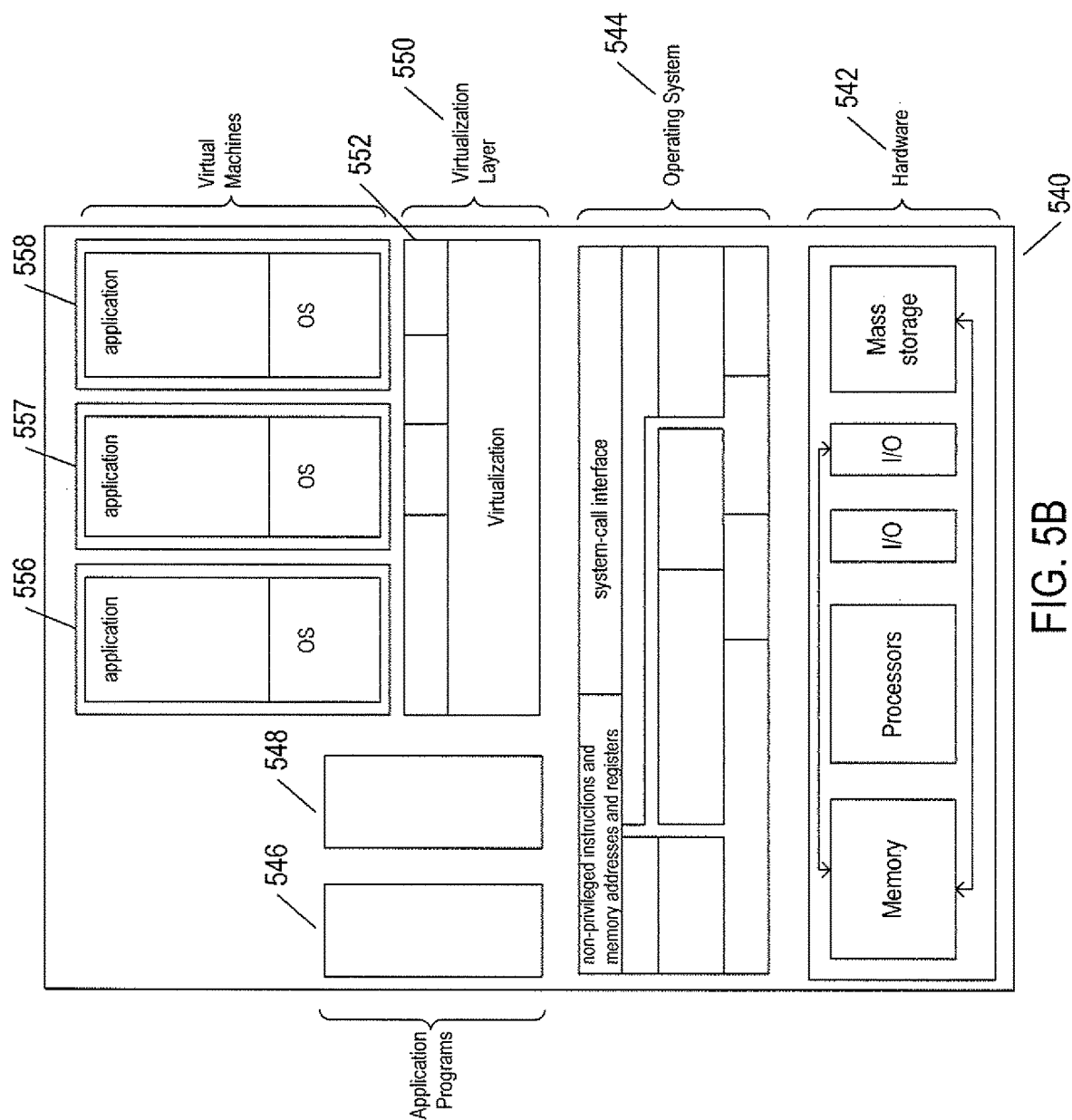

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
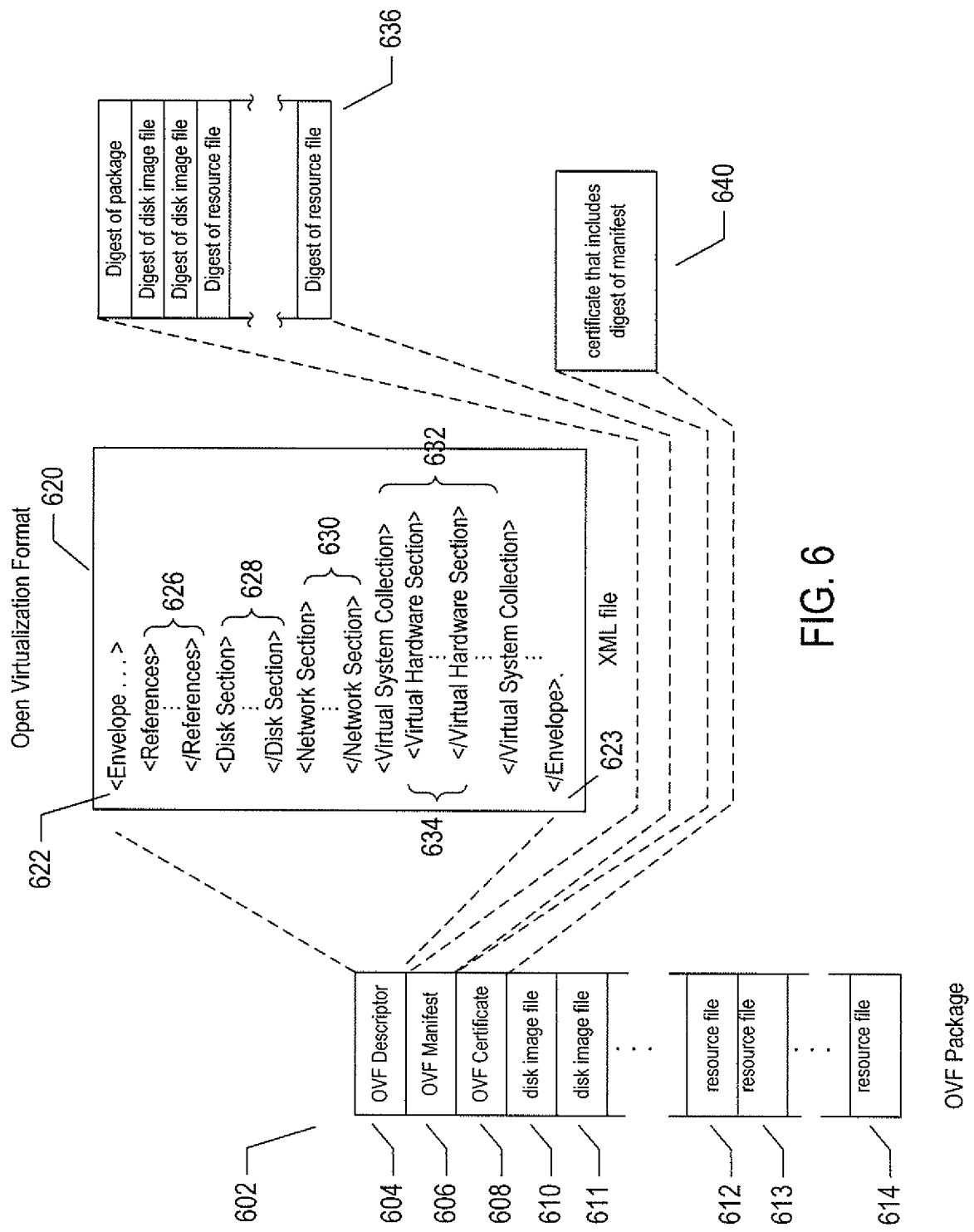
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
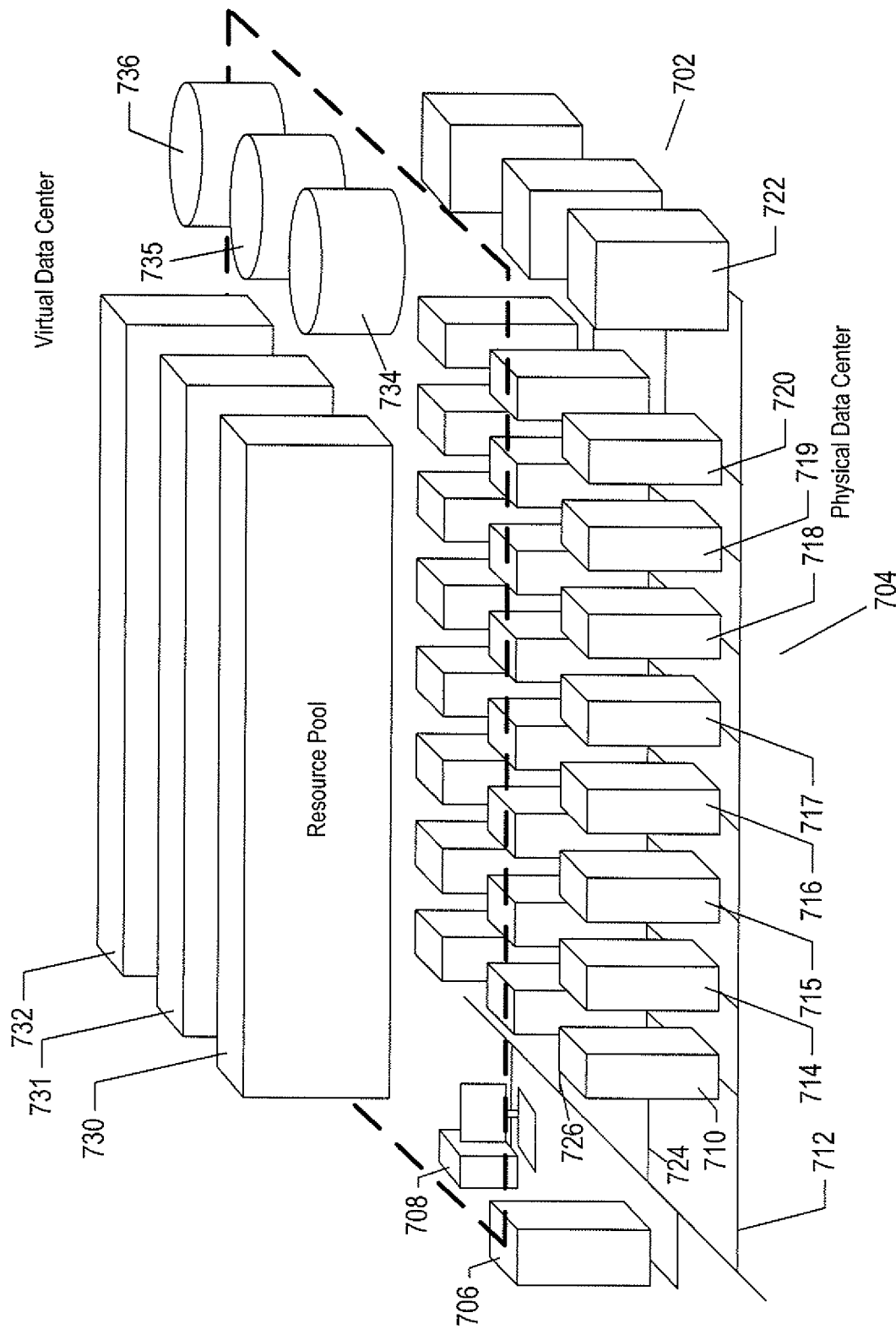
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
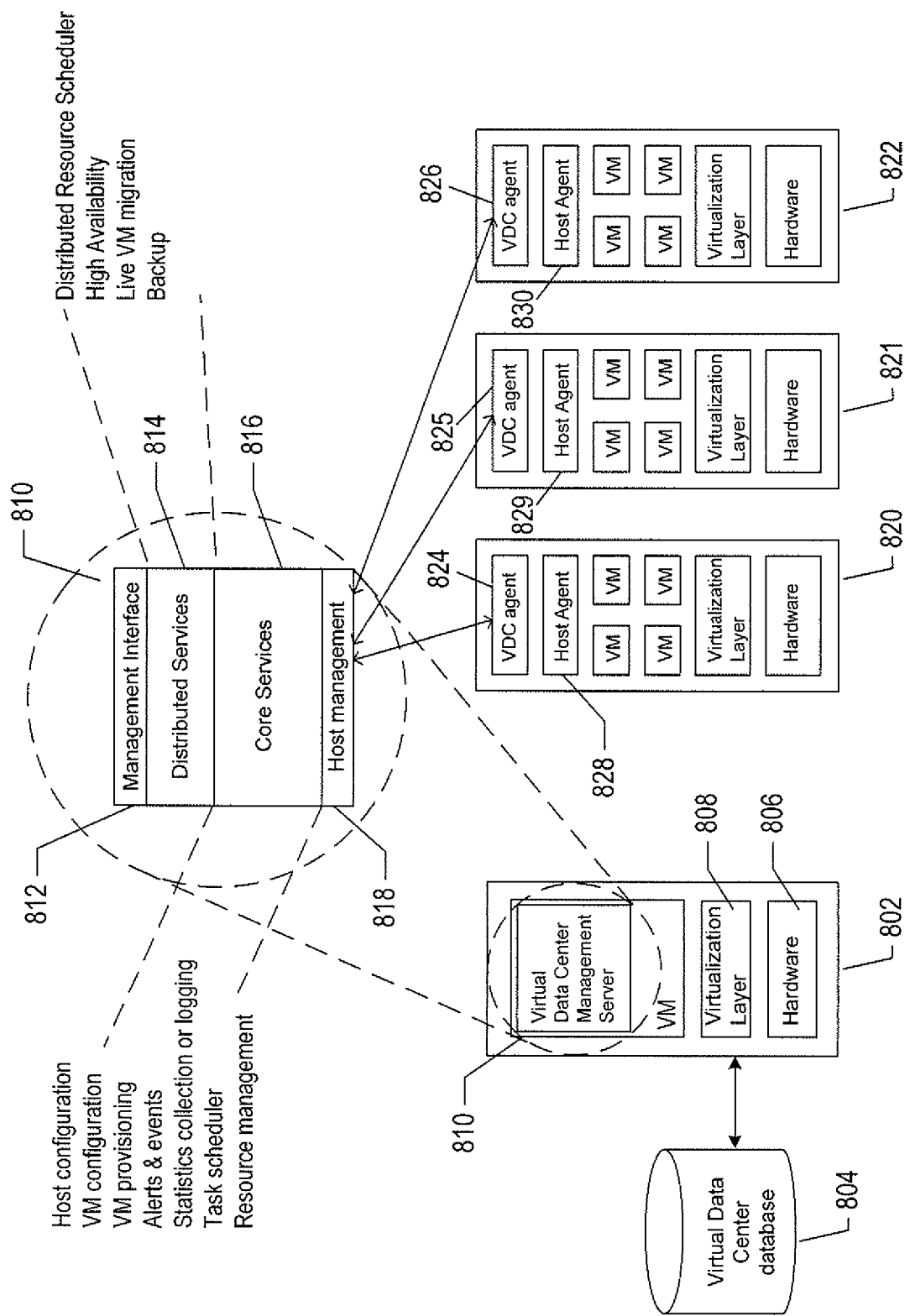
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
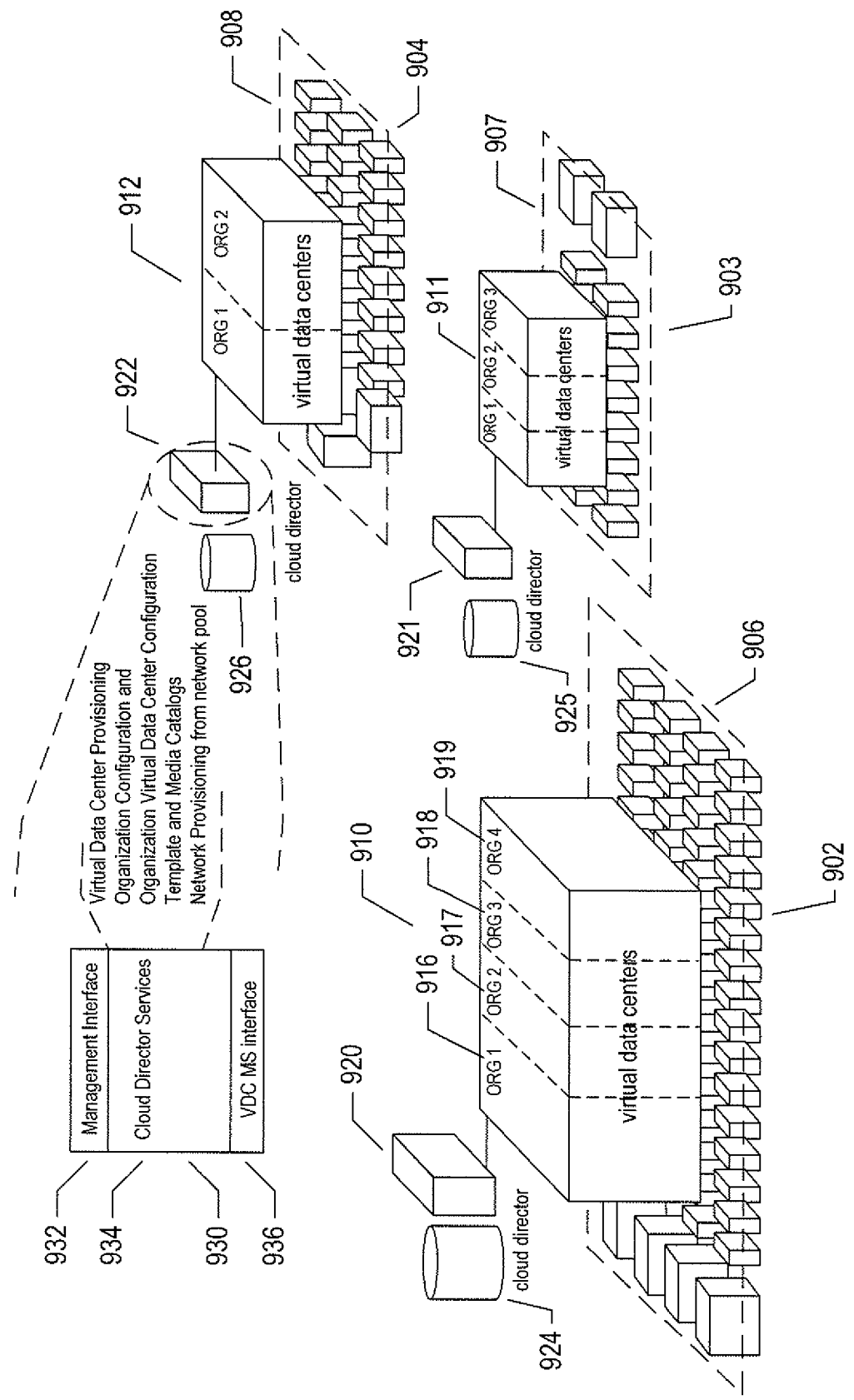
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
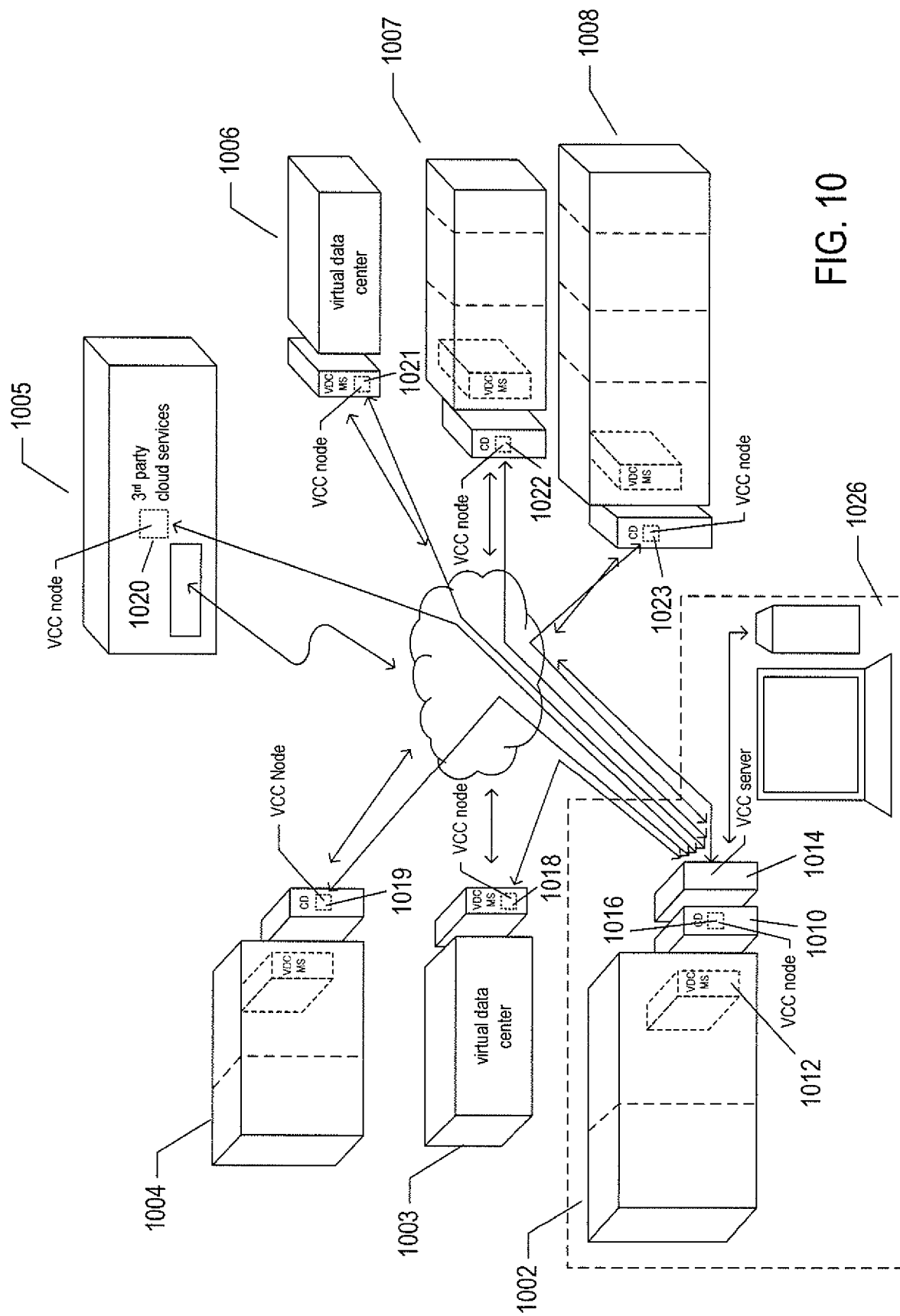
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
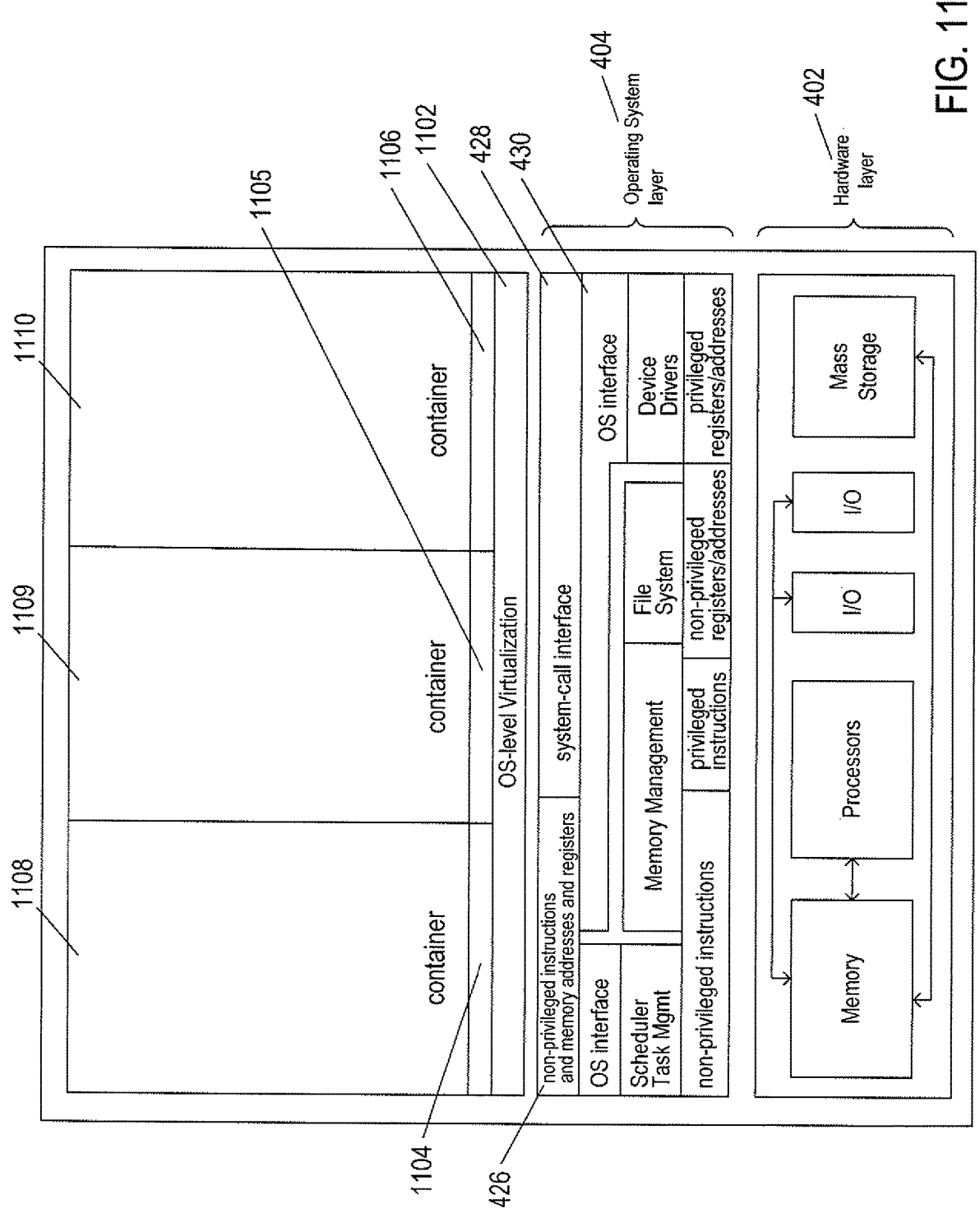
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
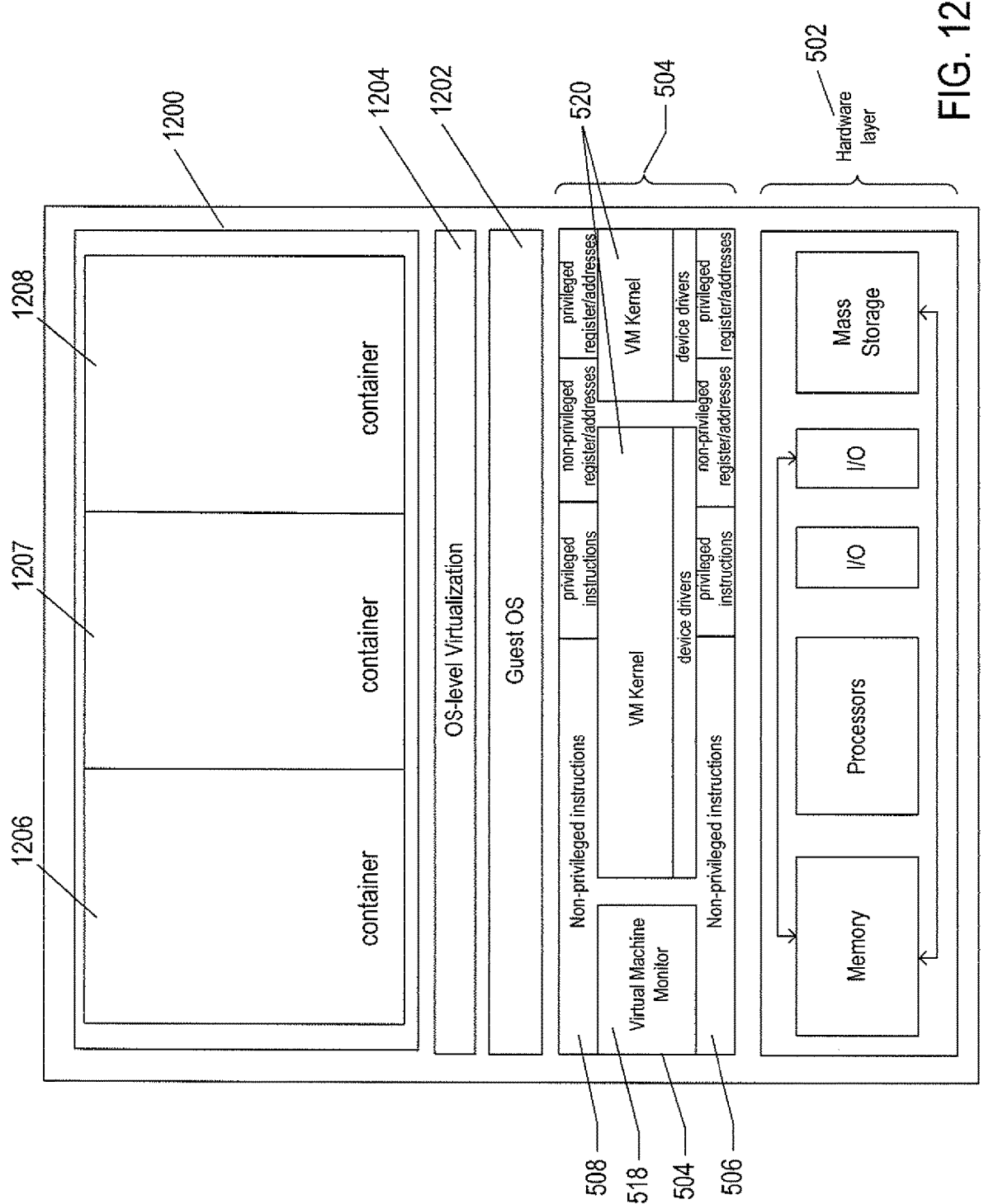
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Event Messages in Event Logs and Determining Event Types

Figure 13:
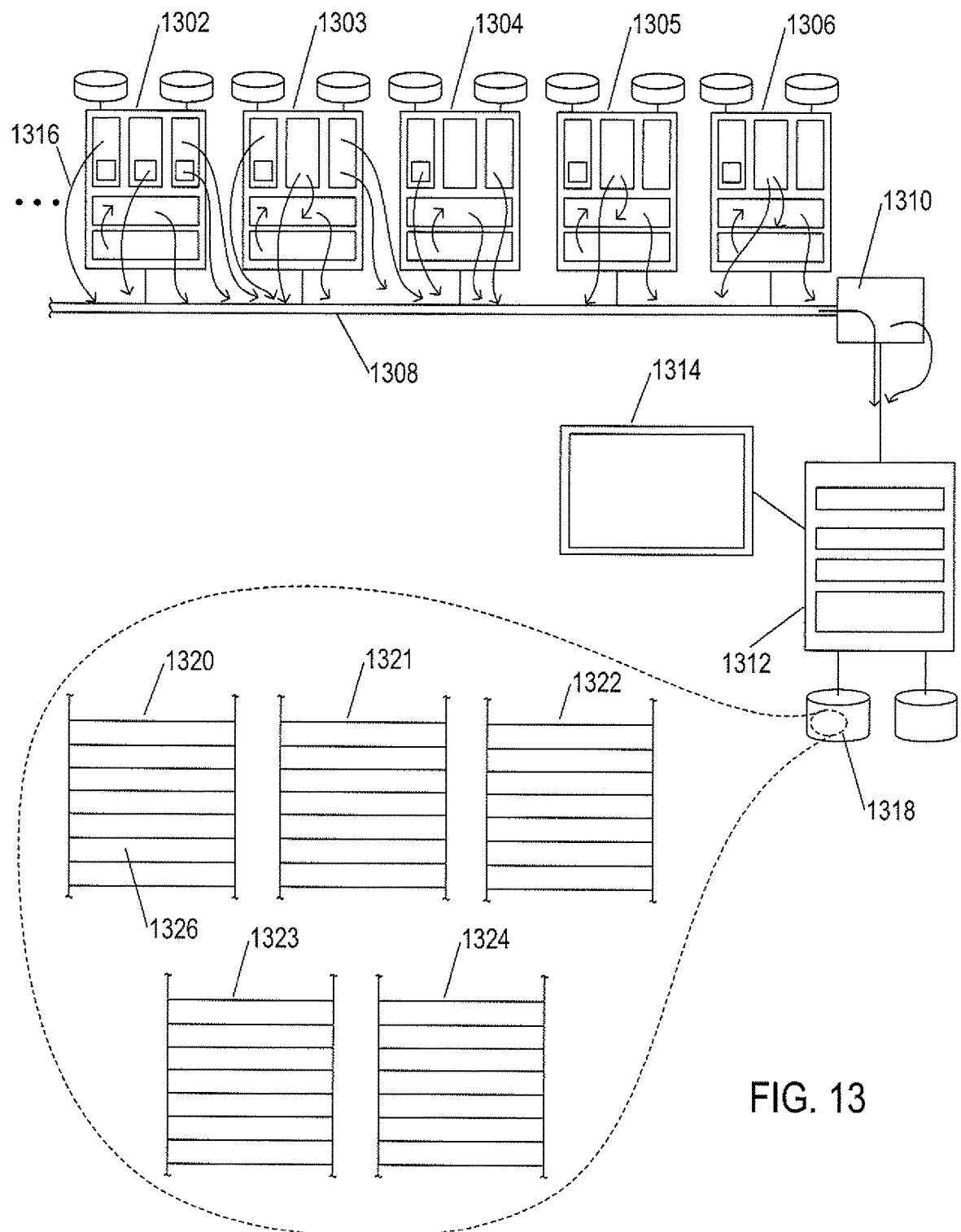
FIG. 13 shows an example of logging event messages in event logs.

FIG. 13 shows an example of logging event messages in event logs. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. One or more of the computer systems 1302-1306 may run a log monitoring agent that collects and forwards event messages to a log management server that runs on the administration console 1314. As indicated by curved arrows, such as curved arrow 1316, multiple components within each of the discrete computer systems 1302-1306 as well as the communications bridge/router 1310 generate event messages that are forwarded to the log management server. Event messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Event messages may be collected at various hierarchical levels within a discrete computer system and then forwarded to the log management server in the administration computer 1312. For example, a log monitoring agent may collect and forward the event messages at various hierarchical levels. The log management server in the administration computer 1312 collects and stores the received event messages in a data-storage device or appliance 1318 as event logs 1320-1324. Rectangles, such as rectangle 1326, represent individual event messages. For example, event log 1320 may comprise a list of event messages generated within the computer system 1302. Each log monitoring agent has an agent monitoring configuration that includes a log path and a log parser. The log path specifies a unique file system path in terms of a directory tree hierarchy that identifies the storage location of an event log associated with the event source on the administrative console 1314 or the data-storage device or appliance 1318. The log monitoring agent receives specific file and event channel log paths to monitor event logs and the log parser includes log parsing rules to extract and format lines of event message into event message fields. The log monitoring agent then sends the constructed structured event messages to the log management server. The administrative console 1314 and computer systems 1302-1306 can function without log management agents and a log management server, but with less precision and certainty.

Figure 14:
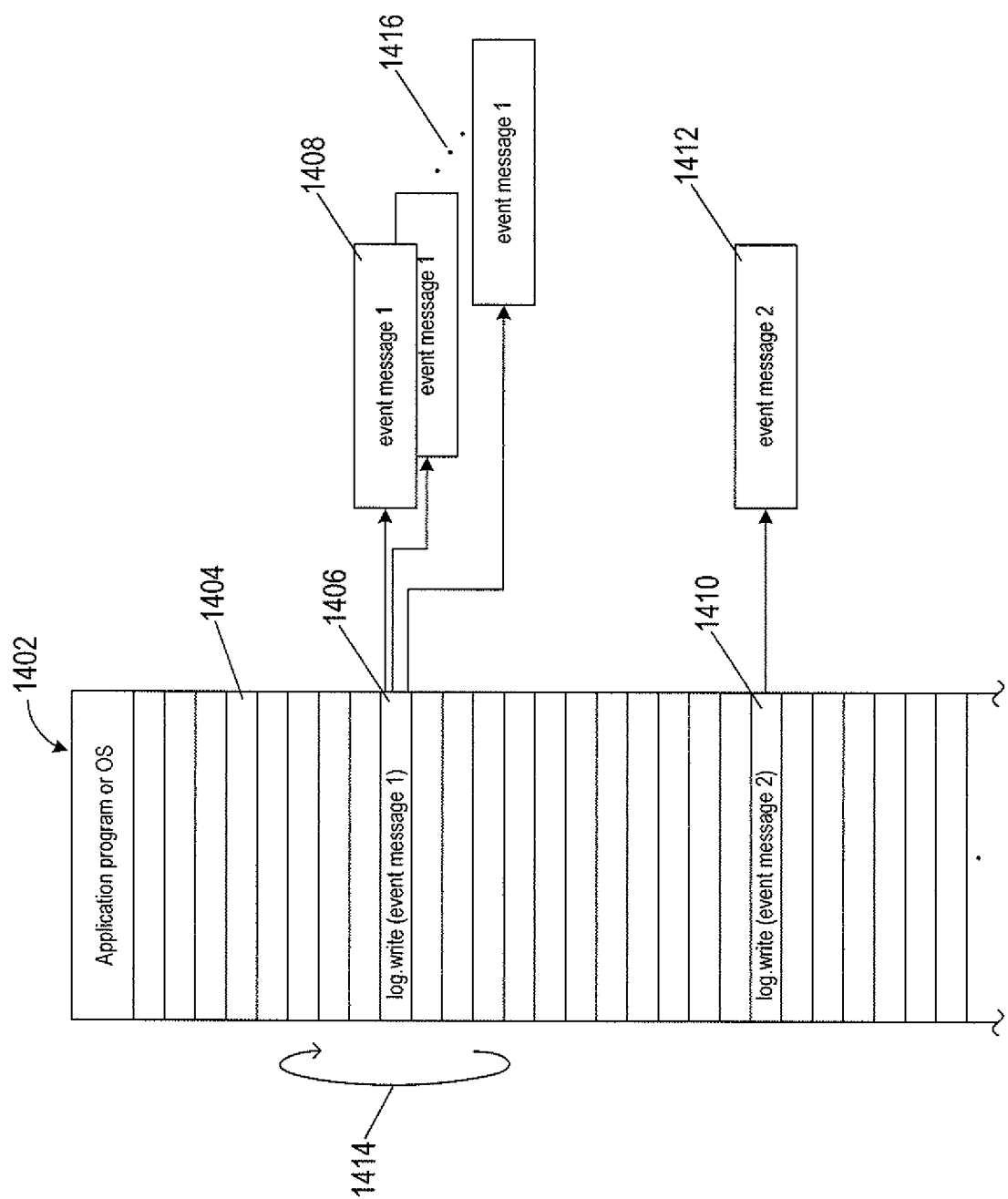
FIG. 14 shows an example of a source code with log write instructions.

FIG. 14 shows an example of a source code 1402 of an application program, an operating system, a VM, a guest operating system, or any other computer program or machine code. The source code 1402 is just one example of an event source that generates event messages. Rectangles, such as rectangle 1404, represent a definition, a comment, a statement, or a computer instruction that expresses some action to be executed by a computer. The source code 1402 includes log write instructions that generate event messages when certain events predetermined by the developer occur during execution of the source code 1402. For example, source code 1402 includes an example log write instruction 1406 that when executed generates an "event message 1" represented by rectangle 1408, and a second example log write instruction 1410 that when executed generates "event message 2" represented by rectangle 1412. In the example of FIG. 14, the log write instruction 1408 is embedded within a set of computer instructions that are repeatedly executed in a loop 1414. As shown in FIG. 14, the same event message 1 is repeatedly generated 1416. The same type of log write instructions may also be located in different places throughout the source code, which in turns creates repeats of essentially the same type of event message in the event log.

In FIG. 14, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. In the example of FIG. 15, the log write instruction 1502 includes arguments identified with "$." For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as "Repair session" 1508. The text strings between brackets "[ ]" represent file-system paths, such as path 1510. When the log write instruction 1502 is executed, parameters are assigned to the arguments and the text strings and natural-language words and phrases are stored as an event message in an event log.

FIG. 16 shows an example of an event message 1602 generated by the log write instruction 1502. The arguments of the log write instruction 1502 may be assigned numerical parameters that are recorded in the event message 1602 at the time the event message is written to the event log. For example, the time stamp 1504, thread 1505, and IP address 1506 of the log write instruction 1502 are assigned corresponding numerical parameters 1604-1606 in the event message 1602. The time stamp 1604, in particular, represents the date and time the event message is generated. The text strings and natural-language words and phrases of the log write instruction 1502 also appear unchanged in the event message 1602 and may be used to identify the type of event that occurred during execution of the application program or operating system.

As event messages are received from various event sources, the event messages are stored in the order in which the event messages are received. FIG. 17 shows a small, eight-entry portion of an event log 1702. In FIG. 17, each rectangular cell, such as rectangular cell 1704, of the portion of the event log 1702 represents a single stored event message. For example, event message 1702 includes a short natural-language phrase 1706, date 1708 and time 1710 numerical parameters, as well as, an alphanumeric parameter 1712 that appears to identify a particular host computer.

Figure 18:
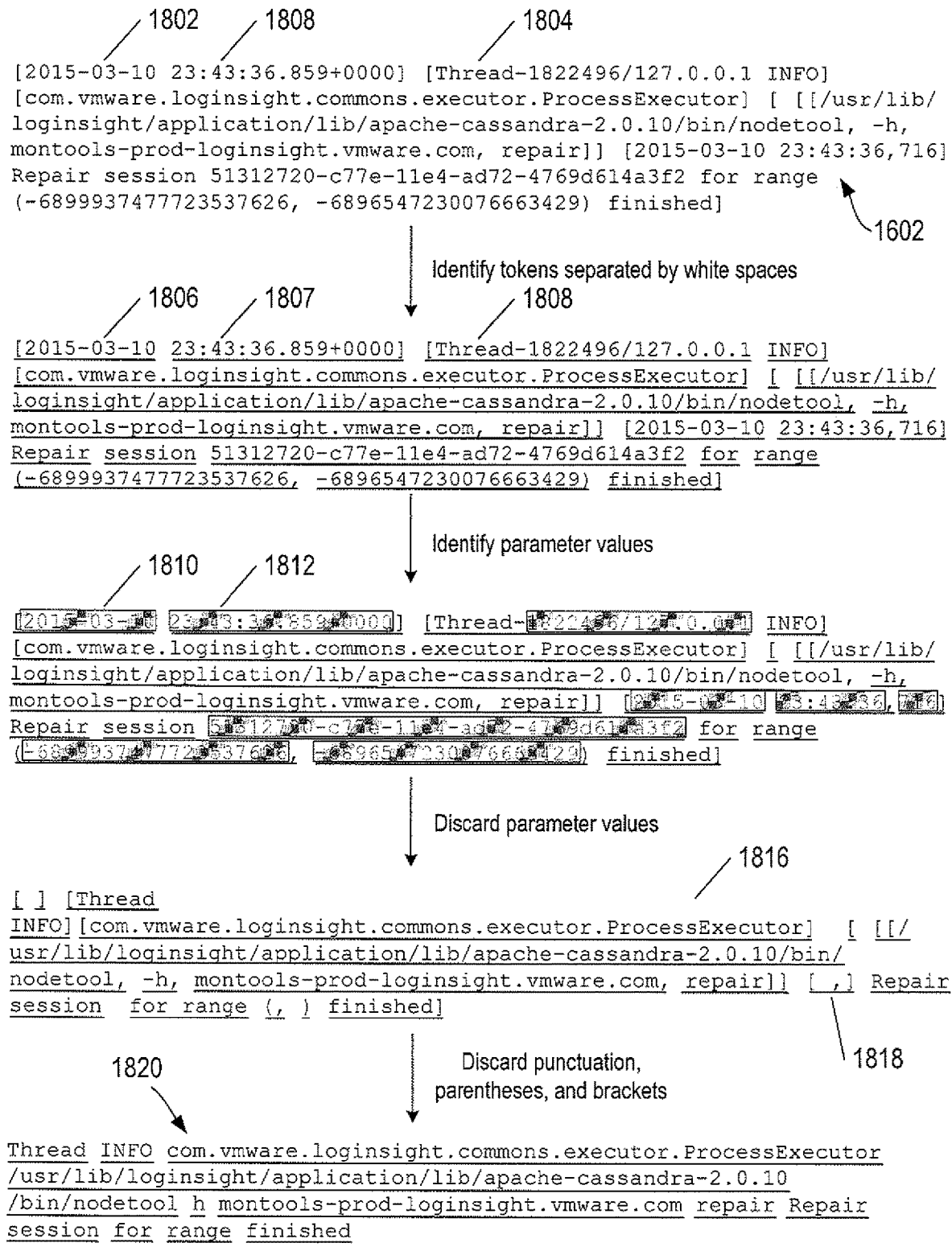
FIG. 18 shows an example of event-type analysis performed on the event message shown in FIG. 16.

FIG. 18 shows an example of event-type analysis performed on the event message 1602 shown in FIG. 16. The event message 1602 is first tokenized by considering the event message as comprising tokens separated by non-printed characters, referred to as "white space." In FIG. 18, this initial tokenization of the event message 1602 is illustrated by underlining of the printed or visible characters. For example, the date 1802, time 1803, and thread 1804 at the beginning of the text contents of the event message 1802, following initial tokenization, become a first token 1806, a second token 1807, and a third token 1808, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Repair session" in event message 1602 likely occurs within each of many repair session event messages. In FIG. 18, the parametric-valued tokens in the event message following initial token recognition are indicated by shading. For example, initial token recognition determines that the first token 1806 is a date and the second token 1807 is a time. The tokens identified as parameters are identified by shaded rectangles, such as shaded rectangle 1810 of the date 1806 and shaded rectangle of 1812 of the time 1807. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing. In the implementation shown in FIG. 18, the event message 1602 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 1814 in FIG. 18. For example, brackets and a coma 1818 are underlined. The punctuation, parentheses, and brackets are discarded leaving a textualized event message of interest 1820 that comprises only the non-parametric text strings and natural language words and phrases of the original event message 1602. The textualized event message 1820 represents an event type. Other textualized event messages with the same non-parametric text strings and natural language words and phrase as the textualized event messages 1820 are the same event type. Another textualized event message with one or more different non-parametric text strings or natural language words and phrase from those of the textualized event messages 1820 is of a different event type.

Figure 19:
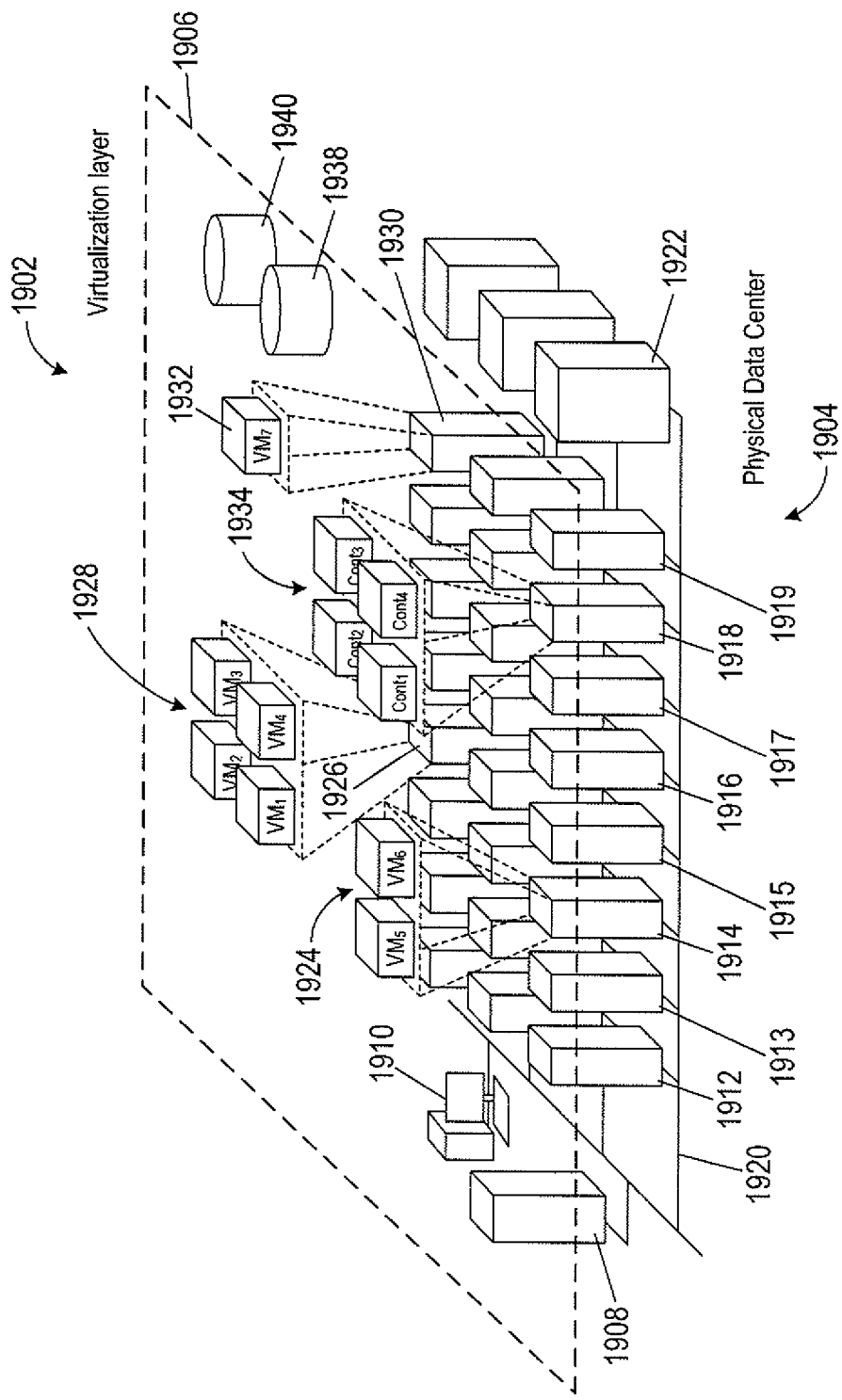
FIG. 19 shows an example of a virtualization layer located above a physical data center.

Methods to Classify and Troubleshoot Problems in Information Technology Systems and Services FIG. 19 shows an example of a virtualization layer 1802 located above a physical data center 1904. The virtualization layer 1902 is shown separated from the physical data center 1904 by a virtual-interface plane 1906. The physical data center 1904 comprises a management server computer 1908 and any of various computers, such as PC 1910, on which a virtual-data-center management interface may be displayed to system administrators and other users. The physical data center 1904 additionally includes many server computers, such as server computers 1912-1919, and a mass-storage array that are coupled together by local area networks, such as local area network 1920, that directly interconnects server computers 1912-1919 and a mass-storage array 1922. Different physical data centers may include many different types of computers, networks, data-storage systems and devices connected according to many different types of connection topologies. The virtualization layer 1902 includes virtual objects, such as VMs and containers, hosted by the server computers in the physical data center 1904. Certain server computers host VMs as described above with reference to FIGS. 5A-5B. For example, server computer 1914 hosts two VMs 1924, server computer 1926 hosts four VMs 1928, and server computer 1930 hosts a VM 1932. Other server computers may host containers as described above with reference to FIGS. 11 and 12. For example, server computer 1918 hosts four containers 1934. The virtual-interface plane 1906 abstracts the physical data center 1904 to one or more VDCs comprising the virtual objects and one or more virtual data stores, such as virtual data stores 1938 and 1940, and one or more virtual networks. For example, one VDC may comprise VMs 1928 and virtual data store 1938 and another VDC may comprise VMs 1924 and virtual data store 1940.

Figure 20A:
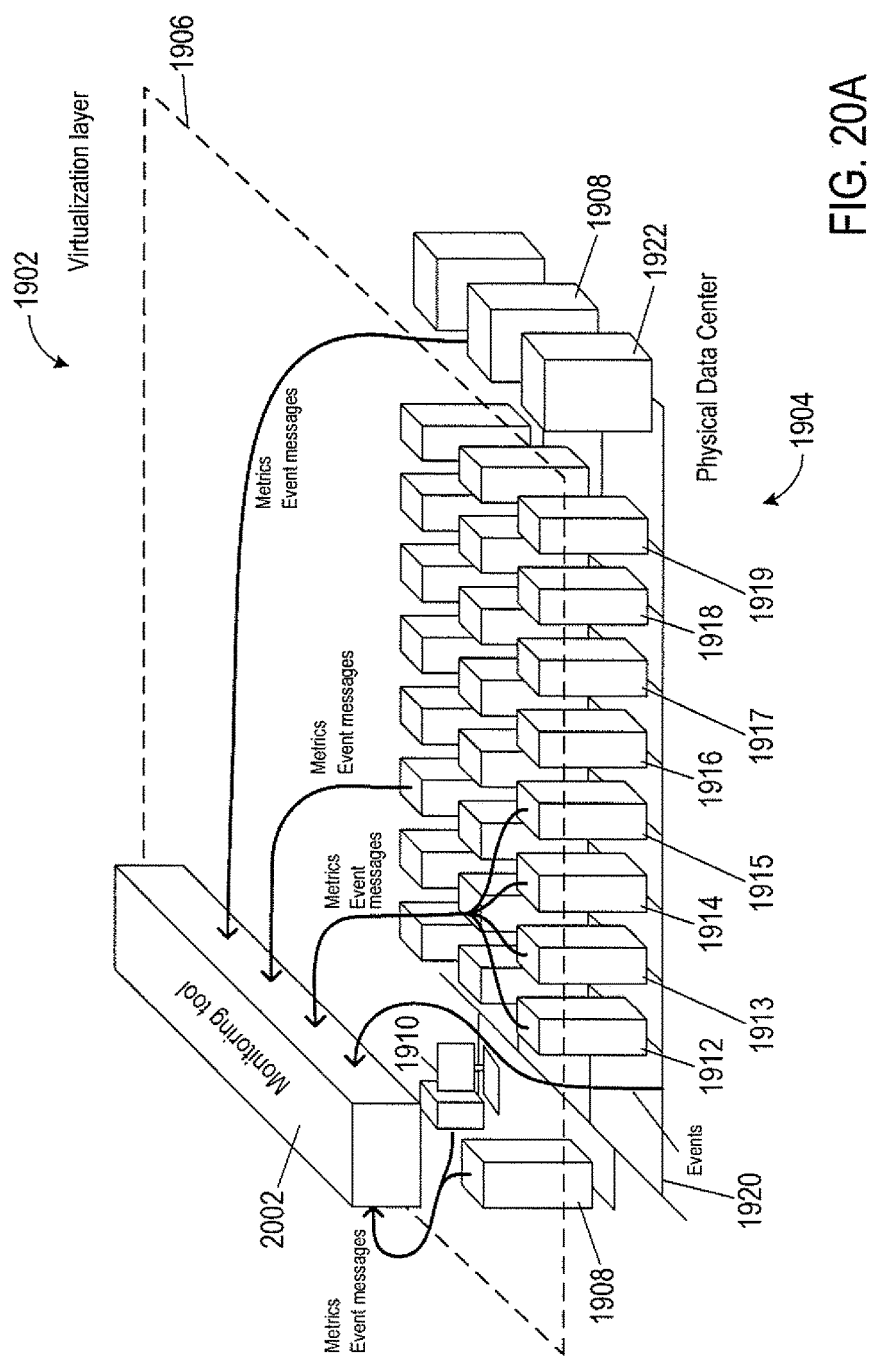
FIGS. 20A-20B show a monitoring tool abstracted to the virtualization layer.
Figure 20B:
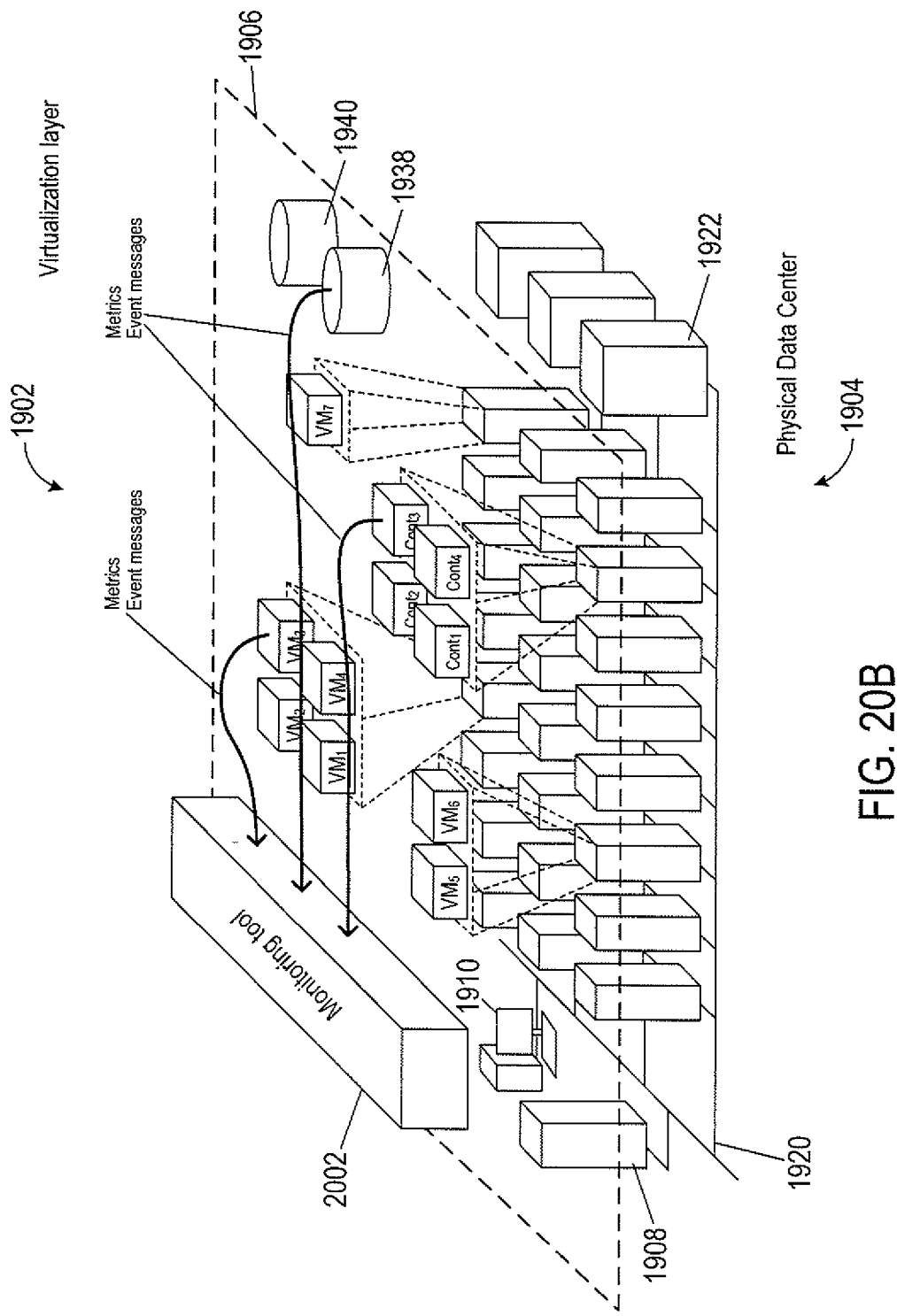

FIGS. 20A-20B show a monitoring tool 2002 abstracted to the virtualization layer 1902. The monitoring tool 2002 is hosted by the management server computer 1908. The monitoring tool 1902 includes an information technology ("IT") operations management server, such as VMware's vRealize® Operations™, and a log management server. The IP operations management server monitors, usage, performance, and capacity of physical resources of each computer system, data-storage device, server computer and other components of the physical data center 1904. The physical resources include, but are not limited to, processors, memory, network connections, and storage of each computer system, mass-storage devices, and other components of the physical data center 1904. The IP operations management server monitors physical resources by collecting time series metric data, such as CPU usage, amount of memory, network throughput, network traffic, and amount of storage. CPU usage is a measure of CPU time used to process instructions of an application program or operating system as a percentage of CPU capacity. High CPU usage may be an indication of unusually large demand for processing power, such as when an application program enters an infinite loop. Amount of memory is the amount of memory (e.g., GBs) a computer system uses at a given time. The log management server receives event messages sent by various log monitoring agents that run on the physical or virtual objects of the distributed computing system 1904 and receives event messages directly from event sources running on physical or virtual objects without log monitoring agents. The log management server maintains event logs of the massive amounts of event messages generated by various VMs, containers, and operating systems running in the physical data center 1904.

As shown in FIGS. 20A-20B, directional arrows represent metric data and event messages sent from physical and virtual objects of the physical data center 1904 to the monitoring tool 2002. In FIG. 20A, PC 1910, server computers 1912-1915, and mass-storage array 1908 send metric data and event messages to the monitoring tool 2002. Network events, such as network throughput and network traffic, of each component of the physical data center 1904 may also be sent to the monitoring tool 2002. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. Clusters of server computers may also send metric data and event messages to the monitoring tool 2002. For example, a cluster of server computers 1912-1915 sends cluster metric data and event messages to the monitoring tool 2002. In FIG. 20B, metric data and event messages are sent from the VMs, containers, virtual storage to the monitoring tool 2002.

The monitoring tool 2002 uses the metric data to evaluate the responsiveness and reliability of IT systems and services in accordance with service-level agreements ("SLAs") between data center tenants and an IT service provider. An SLA between a data center tenant and an IT service provider is a contractual agreement that describes specific service-level objectives ("SLOs"). The SLA describes the IT services, financial aspects of service delivery, and key performance indicators ("KPIs") that are used to monitor compliance with the SLOs of an SLA. For example, a tenant may run a web site in the physical data center 1904, which requires use of server computers and data-storage devices to host application programs, data backup, network access, and data storage. The SLOs describe an agreed upon amount of storage, amount of backup storage, response time to client requests, and network throughput to be provided by the IT service provider to a data center tenant.

KPIs can be computed as a function of one or more metrics. A metric is time series metric data denoted by x(t), where t is a time when the metric is recorded. KPIs used to evaluate compliance with an SLA include network throughput, application response times to client requests, resolution time for capacity bottlenecks, number of service interruptions, and average duration of service interruptions. For example, the response time of an application program to a client request is recorded at time t after the request has been completed. The response time of the application server or computer server is the total amount of time spent to complete the client's request. The response time may be computed as a sum of metrics, such as network response time (e.g., time to transmit the request to the server plus time to receive the response at the client), wait time the request spends in a queue, and time to process the request and generate the response at the server.

Equations (1a)-(1e) below are examples of ways to compute KPIs. A KPI may be a sum of time series metrics:

$$X(t) = \sum_{j=1}^{J} x_j(t) \tag{1a}$$

where
t is a time stamp;
$x_j(t)$ is a j-th metric; and
J is the number of metrics associated with the KPI.
A KPI may be an average of performance metrics at time t:

$$X(t) = \frac{1}{J}\sum_{j=1}^{J} x_j(t) \tag{1b}$$

A KPI may be the largest of J time series metrics at time t:

$$X(t) = \max\{x_j(t)\}_{j=1}^{J} \tag{1c}$$

A KPI may be the smallest of J time series metrics at time t:

$$X(t) = \min\{x_j(t)\}_{j=1}^{J} \quad (1d)$$

Equation (1a) may be used to determine the number of service interruptions in a VDC or data center over time, where $x_j(t)$ represents a count of interruptions in the j-th service at time t. Equation (1a) may also be used to determine the network throughput of a VDC, cluster of server computers, or a data center, where $x_j(t)$ represents the number of data packets delivered to the j-th VM or server computer at time t. Equation (1b) may be used to determine average duration of a service interruption per unit time of a VDC or data center over time, where $x_j(t)$ represents duration of an interruption in the j-th service recorded at time t.

Each KPI has associated upper and/or lower KPI thresholds. When KPI data violates a threshold, an alert is generated and the alert may be displayed on a management interface of an IT administrators console indicating a problem has been detected in the operation of an IT system or performance of an IT service measured by the KPI. However, KPI data may violate a threshold for any number of reasons. The KPI data reveals nothing about the cause of problems in the IT system or service. As a result, IT administrators manually try to determine the cause of the problem and execute remedial action, which is time consuming and costly to the data center tenant and the IT service provider.

The monitoring tool 2002 generates and records each set of KPI data over time. The monitoring tool 2002 executes methods described below to search each set of previously recorded KPI data within a historical time period denoted by $[t_b, t_e]$ for threshold violations, where $t_b$ represents the beginning of the historical time period and $t_e$ represents the end of the historical time period. The historical time period is a suitable time period for observing a history of aberrations in a KPI. For example, the historical time period may be 24 hours, a day, two days, a week, or a month. Methods described identify the start time of each aberration in the previously recorded KPI data over the historical time period $[t_b, t_e]$. An aberration starts at a time, $t_j$, when an upper KPI threshold, $T_{KPI}^{up}$, is violated as follows:

$$X(t_j) > T_{KPI}^{up} \quad (2a)$$

An aberration also occurs at a time $t_j$ when a lower threshold, $T_{KPI}^{low}$, is violated as follows:

$$X(t_j) < T_{KPI}^{low} \quad (2b)$$

When a threshold violation occurs, an alert is trigged indicating a problem occurred with the IT systems or services monitored with the KPI data.

Figure 21:
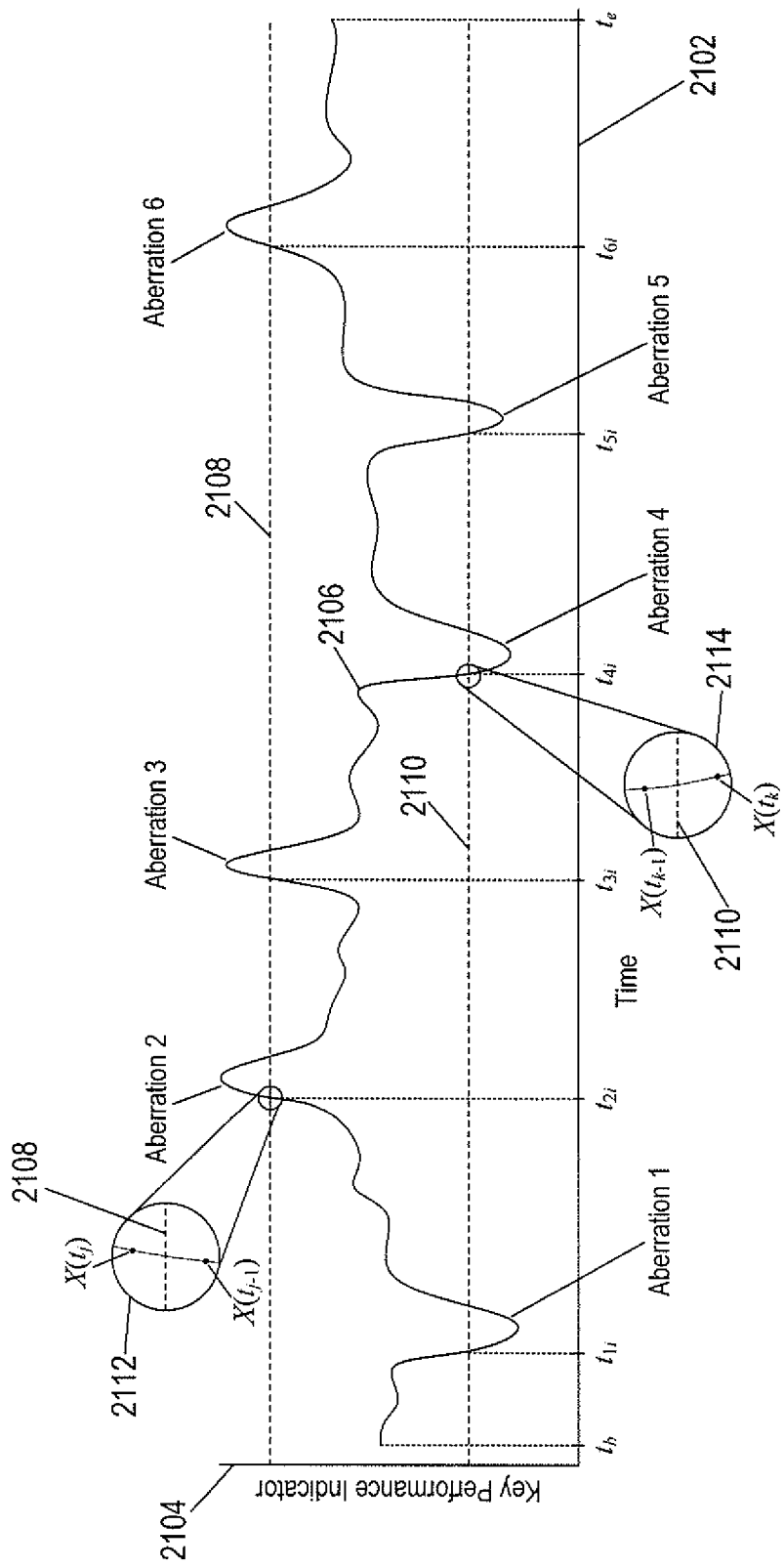
FIG. 21 shows a plot of example previously recorded key performance indicator ("KPI") data.

FIG. 21 shows a plot of example previously recorded KPI data and associated upper and lower KPI thresholds. Horizontal axis 2102 represents time. Vertical axis 2104 represents a range of KPI values. Curve 2106 represents previously recorded KPI data over a historical time period $[t_b, t_e]$ identified along the time axis 2102. Dashed line 2108 represents an upper KPI threshold and dashed line 2110 represents a lower KPI threshold for the KPI data. Times $t_{1s}$, $t_{2s}$, $t_{1s}$, $t_{4s}$, $t_{5s}$, and $t_{6s}$ are start times when the previously recorded KPI data violated the associated KPI thresholds 2108 and 2110 in the historical time period. Each threshold violation may have triggered an alert indicating a historical problem occurred with the IT system or service monitored with the KPI data.

Previously recorded KPI data is searched to determine a start time for each historical aberration recorded in the KPI data. When the KPI data has an upper KPI threshold and a lower KPI threshold, a start time of an historical aberration is determined from the slope:

$$\text{slope} = \frac{X(t_j) - X(t_{j-1})}{t_j - t_{j-1}} \quad (3)$$

where
$X(t_j)$ is a KPI data point that violates the KPI threshold; and
$X(t_{j-1})$ is a KPI data point recorded prior to the KPI data point $X(t_j)$.

When the threshold is an upper KPI threshold, $X(t_j)$ satisfies condition (2a), and the slope is positive, the start time of the aberration is set to $t_j$. Alternatively, when the threshold is a lower KPI threshold, $X(t_j)$ satisfies condition (2b), and the slope is negative, the initial time of the aberration is set to $t_j$. For example, FIG. 21 shows a magnified view 2112 of a KPI data point $X(t_j)$ that violates the KPI threshold 2108 and a KPI data point $X(t_{j-1})$ below the KPI threshold 2108. The slope is positive and the start time $t_{2s}$ is assigned the time $t_j$. Magnified view 2114 of a KPI data point $X(t_k)$ that violates the KPI threshold 2110 and a KPI data point $X(t_{k-1})$ above the KPI threshold 2110. The slope is negative and the start time $t_{4s}$ is assigned the time $t_k$.

An automated process to determine the start times of aberrations recorded in a set of previously recorded KPI data may be executed using the following pseudocode:

```
1   n = 1; //initialize index for initial time of a threshold violation
2   t_0 = t_b;
3   for (j = 1; t_j ≤ t_e; j++) {
4       read X(t_j) from set of previously recorded KPI data;
5       if (X(t_j) > T_KPI^up and X(t_{j-1}) < T_KPI^up) {
6           slope = (X(t_j) - X(t_{j-1}))/(t_j - t_{j-1});
7           if (slope > 0) {
8               t_ns = t_j is an initial time of the nth aberration;
9               n++;
10          }
11      }
12      if (X(t_j) < T_KPI^low and X(t_{j-1}) > T_KPI^low) {
13          slope = (X(t_j) - X(t_{j-1}))/(t_j - t_{j-1});
14          if (slope < 0) {
15              t_ns = t_j is an initial time of the nth aberration;
16              n++;
17          }
18      }
19  }
```

In FIG. 21, six aberrations identified as Aberration 1, Aberration 2, Aberration 3, Aberration 4, Aberration 5, and Aberration 6 occur at the start times $t_{1s}$, $t_{2s}$, $t_{3s}$, $t_{4s}$, $t_{5s}$, and $t_{6s}$, respectively. But there is no way to determine from examining the KPI data alone what is the nature or cause each of these aberrations. For example, Aberrations 1 and 4 may be caused by the same problem, but Aberration 3 may be the result of an entirely different unrelated problem. A time window is formed for each aberration with the start time of the time window corresponding to the start time of the aberration. The time window is denoted by, $[t_{ms}, t_{mf}]$, where m is a positive integer, $t_{mf} = t_{ms} + t_w$ is the finish time of the time window, and $t_w$ is the duration of the time window. Event messages generated by one or more event sources associated with the KPI data in each time window are read from event logs. The event-type distribution of event messages generated within a time window provides additional information that is used to identify the type of problem associated with an aberration. For example, the KPI data may be a response time of an application program to client requests with previously recorded historical aberrations. The event sources may be the application program, operating system of the server computer that hosts the application program, and, if the application program is run in a VM, another event source is the guest operating system of the VM used to run the application program. An event-type distribution of event messages generated by these event sources with time stamps recorded in a time window associated with the aberration is used to identify the type of problem that caused the historical aberration in the KPI data.

Figure 22:
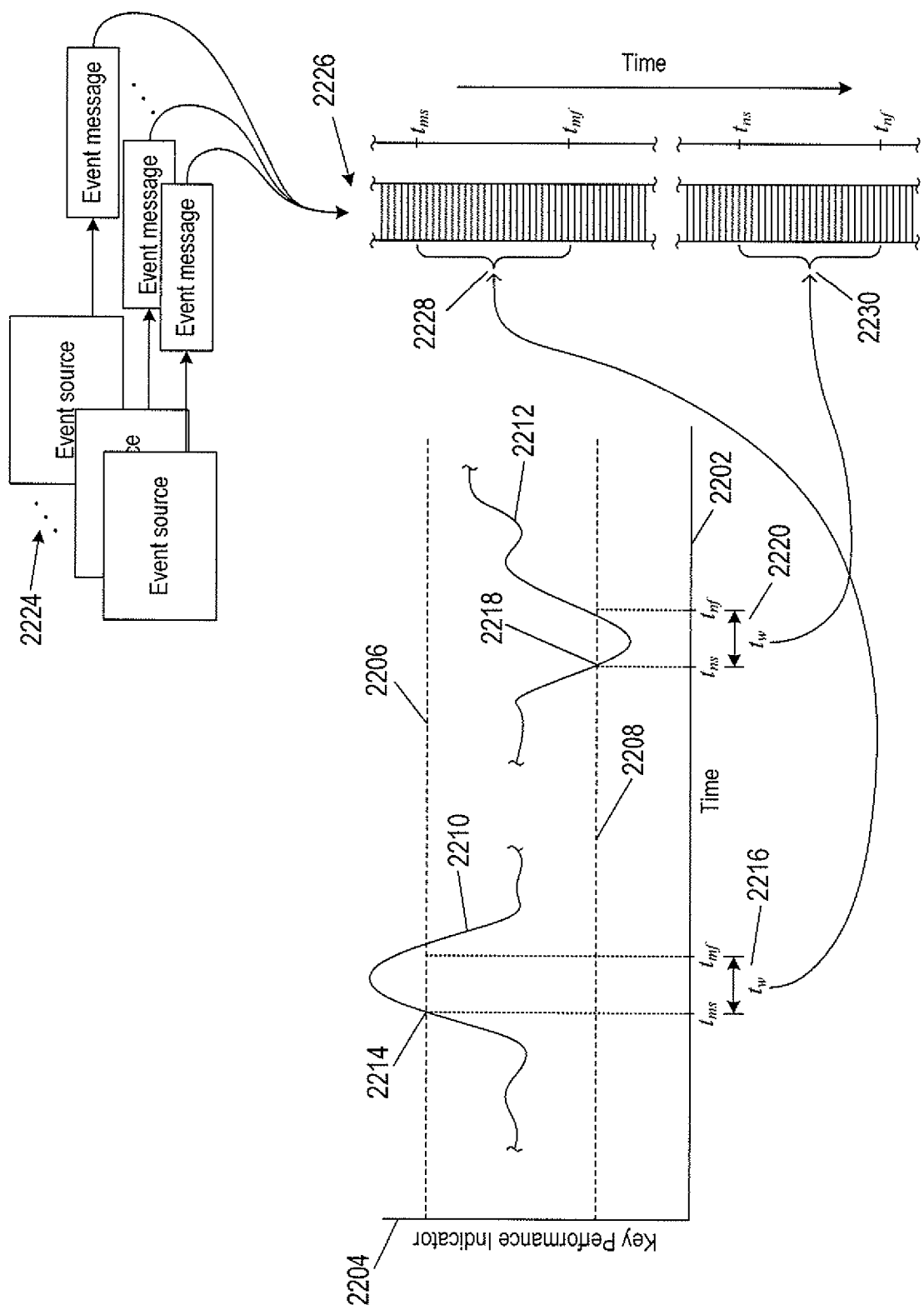
FIG. 22 shows a plot of two threshold violations for a set of KPI data.

FIG. 22 shows a plot of two threshold violations for a set of KPI data. Horizontal axis 2202 represents time. Vertical axis 2204 represents a range of KPI values. Horizontal dashed lines 2206 and 2208 represent upper and lower thresholds for the KPI. Curves 2210 and 2212 represents portions of previously recorded KPI data surrounding threshold violations. A first threshold violation 2214 starts at time $t_{ms}$ and represents a first aberration with a corresponding time window 2216. A second threshold violation 2216 starts at time $t_{ns}$ and represents a second aberration with a time window 2218. The time windows 2216 and 2220 have the same duration $t_w$. The time window 2216 is shorter than the duration of the first aberration, and the time window 2220 is longer than the duration of the second aberration. FIG. 22 also shows event sources 2224 associated with the IT system or service monitored by the KPI data. The event sources generate event messages recorded in an event log 2226. Event messages 2228 with time stamps in the first time window are identified. Event messages 2230 with time stamps in the second time window are identified.

Figure 23:
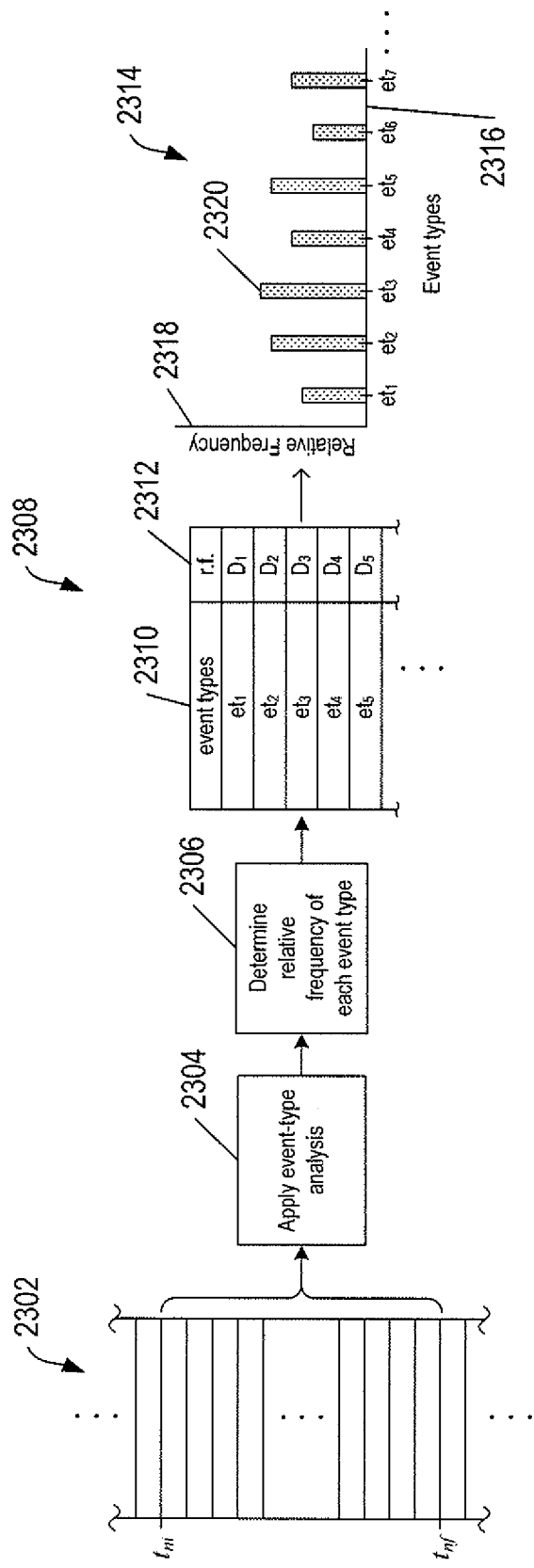
FIG. 23 shows a method to determine an event-type distribution from event messages recorded with a time window.

An event-type distribution is computed for the event messages in the time windows. FIG. 23 shows a method of determining an event-type distribution from event messages recorded with a time window $[t_{ns}, t_{nf}]$ associated with an aberration. In block 2304, event-type analysis is applied to each event message to determine the event type of each event message. Event-type analysis reduces the event message to text strings and natural-language words and phrases (i.e., non-parametric tokens), as described above with reference to FIG. 18. The different event types are denoted by $et_i$, where i is an event type index. In block 2306, a relative frequency of each event type is computed according to $$D_i^n = \frac{n(et_i)}{N_n} \quad (4)$$

where
$n(et_i)$ is the number of times an event type, $et_i$, appears in the event messages recorded in the time window $[t_{ns}, t_{nf}]$; and
$N_n$ is the total number of event messages collected in the time window $[_{ns}, t_{nf}]$.

An event-type log 2308 is formed from the different event types and associated relative frequencies. The event-type log 2308 comprises a list of the different event types 2310 and corresponding relative frequencies 2312 of each event type and serves as a record of the event-type distribution. FIG. 23 also shows a histogram 2314 of the event-type distribution recorded in the event-type log 2308. Horizontal axis 2316 represents the different event types. Vertical axis 2318 represents a range of relative frequencies. Shaded bars represent the relative frequency of each event type. For example, shaded bar 2320 represents the relative frequency $D_3^n$ of the event type $et_3$. A historical event-type distribution for K historical aberrations of a set of KPI data is given by $$ET_n = (D_1^n, D_2^n, D_3^n, \ldots, D_K^n) \quad (5)$$

where
K is the number of event types; and
n an aberration index with n=1, . . . , N.
Each historical event-type distribution $ET_n$ is a point in a K-dimensional space.

Figure 24:
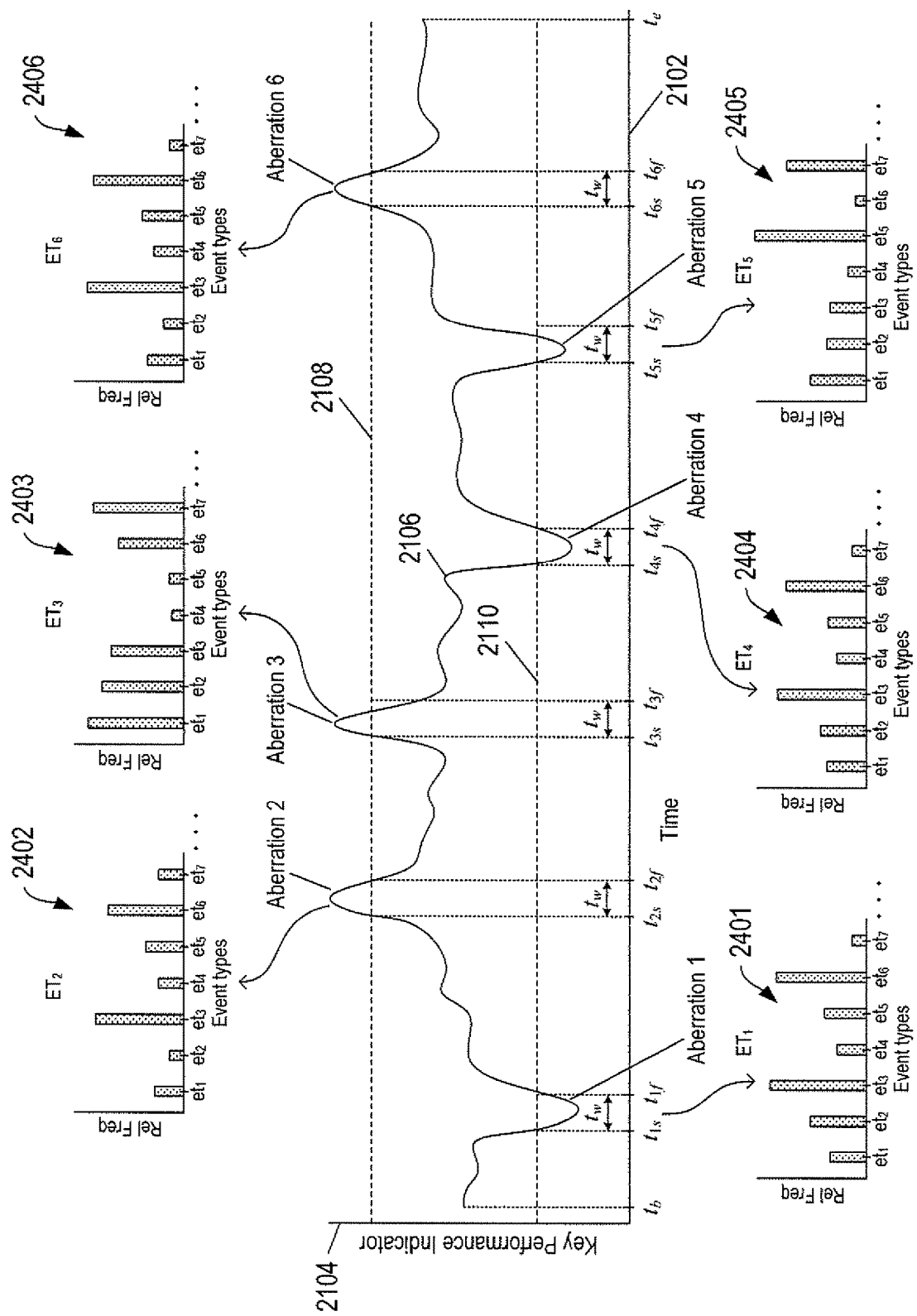
FIG. 24 shows examples of event-type distributions determined for aberration in the set of KPI data shown in FIG. 21.

FIG. 24 shows examples of historical event-type distributions 2401-2406 determined for each of the six aberrations in the set of KPI data shown in FIG. 21. Each historical event-type distribution comprises a pattern of event type relative frequencies that serves as identification of each historical aberration in previously recorded KPI data. Historical aberrations with similar event-type distributions indicate that the same type of problem occurred at different times in the past. In FIG. 24, for example, historical event-type distributions 2401 and 2404 are similar, which indicates that the same type of problem previously occurred at times $t_{1s}$ and $t_{4s}$. Historical event-type distributions 2402 and 2406 are also similar, which indicates that same type of problem previously occurred at times $t_{2s}$ and $t_{6s}$. On the other hand, different historical event-type distributions are an indication of different types of problems. For example, historical event-type distributions 2403 and 2405 are not similar to the other historical event-type distributions shown, which indicates that corresponding Aberrations 3 and 5 are the result of different types of problems than the types of problems that created the Aberrations 1, 2, 4, and 6.

Figure 25:
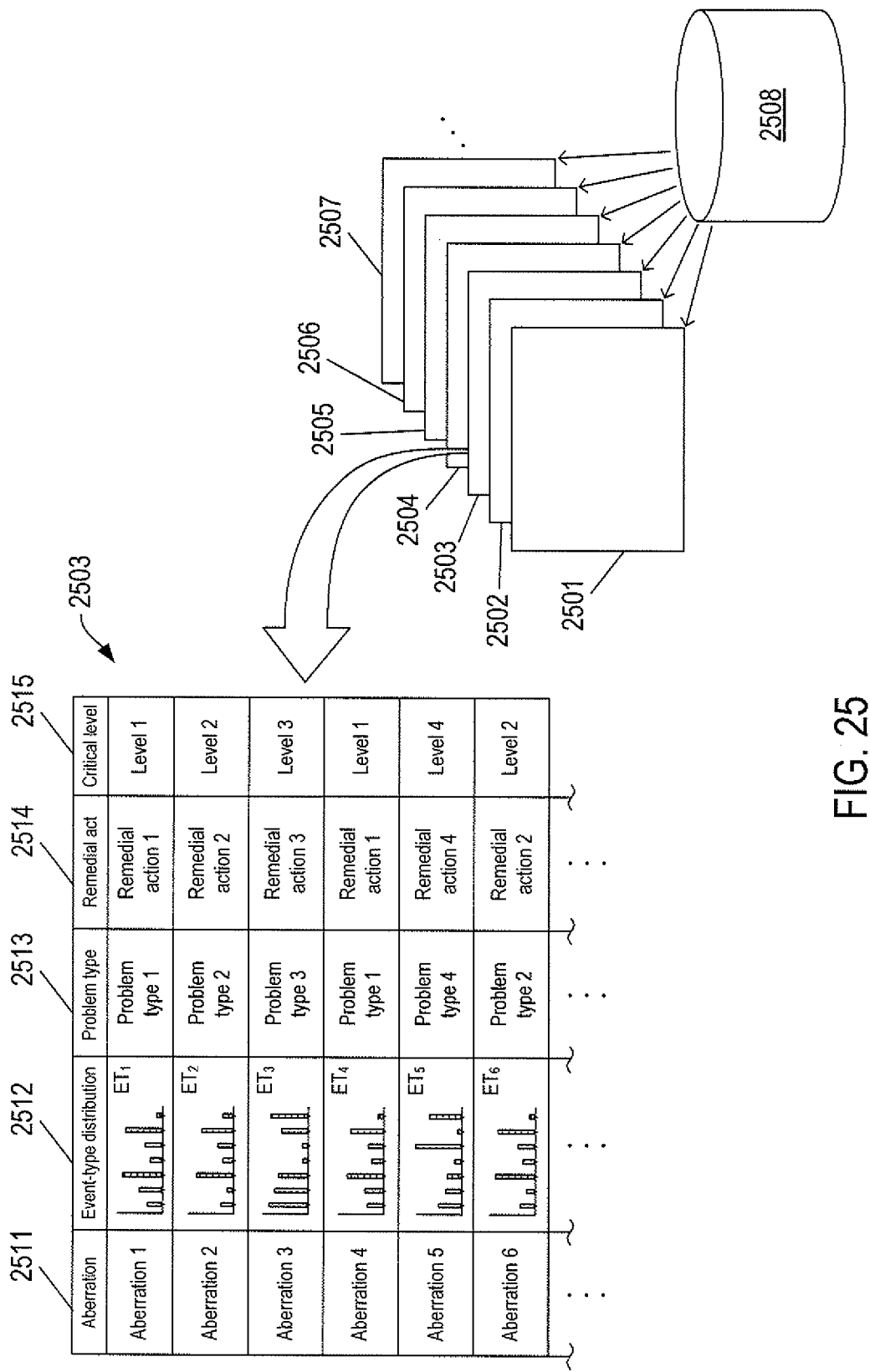
FIG. 25 shows separate historical records of KPI aberrations.

For each KPI, a dataset of historical event-type distributions, problem types, and remedial actions taken to remedy the problems are stored as a historical record of KPI aberrations in a data-storage device. FIG. 25 shows separate historical records 2501-2507 of KPI aberrations stored in a data-storage device 2508. Each historical record comprises a list of problem types, remedial actions taken to remedy the problems, and associated historical event-type distributions for each aberration in the previously recorded KPI data obtained as described above with reference to FIGS. 22 and 23. For example, historical record 2503 of the KPI aberrations, historical event-type distributions, problem types, and remedial actions for the KPI data shown in FIG. 24. Column 2511 list each of the aberrations identified from searching the KPI data as described above. Column 2512 list historical event-type distributions associated with each historical aberration described above with reference to FIG. 24. Column 2513 list problem types of each historical aberration listed in column 2511. Column 2514 list remedial action taken to remedy the problem type listed in column 2513. Column 2515 list the criticality level of each problem type. Higher level critical levels require immediate action and lower level critical levels do not require immediate action.

Each of the problem types may have been previously identified by IT administrators and recorded in the historical record when addressing the corresponding historical aberration. The remedial actions are instructions and/or sets of commands used to remedy particular problems that created the corresponding aberrations in the KPI data. For example, Aberrations 1-6 correspond to the threshold violations in the KPI data shown in FIG. 24. Aberration 3 is a historical aberration in the set of previously recorded KPI data with an associated historical event-type distribution $ET_3$ determined as described above with reference to FIGS. 22 and 23. The corresponding type of problem is identified as Problem type 3, which has been identified by an IT administrator who addressed the problem or identified from error messages or warnings in event messages generated within the time window of Aberration 3. Remedial action 3 represents the remedial action taken by an IT administrator to remedy the type of problem that created Aberration 3. Aberrations 1 and 4 have very similar historical event-type distributions $ET_1$ and $ET_4$, are identified as the same Problem type 1, and have the same Remedial action 1. Likewise, Aberrations 2 and 6 have very similar historical event-type distributions $ET_2$ and $ET_6$, are identified as the same Problem type 2, and have the same Remedial action 2.

As KPI data is generated in real time, each KPI data point is compared with a corresponding upper and/or lower KPI threshold to detect a threshold violation, as described above with reference to Equations (2a) and (2b). When a threshold violation is detected in real time at time, $t_{rs}$, according to either of Equations (2a) and (2b), an alert is generated and an event-type distribution is generated for event messages recorded with a time window $[t_{rs}, t_{rf}]$, where $t_{rf}=t_{rs}+t_w$. A relative frequency of each event type is computed according to $$D_i^r = \frac{n(et_i)}{N_r} \quad (6)$$

where
$n(et_i)$ is the number of times an event type, $et_i$, appears in the event messages recorded in the time window $[t_{rs}, t_{rf}]$; and
$N_r$ is the total number of event messages collected in the time window $[t_{rs}, t_{rf}]$.

A real-time event-type distribution for a real-time aberration is given by $$ET_r=(D_1^r, D_2^r, D_3^r, \ldots, D_K^r) \quad (7)$$

The real-time event-type distribution is a K-dimensional point in the K-dimensional space. The term "real-time" relates the event-type distribution in Equation (7) to the real-time KPI data threshold violation and is not intended to mean that the event-type distribution is computed immediately following the threshold violation. A real-time event-type distribution may be generated some time after the real-time KPI threshold violation, because the duration, $t_w$, of the time window to collect event messages and computational time to compute the event-type distribution have to elapse before computation of the event-type distribution.

A distance is computed between the real-time event-type distribution, $ET_r$, of the real-time aberration and each of the historical event-type distributions, $ET_n$, of the N historical aberrations of the same KPI. In certain implementations, the distance may be computed using a cosine distance given by:

$$Dist_{CS}(ET_r, ET_n) = \frac{2}{\pi}\cos^{-1}\left[\frac{\sum_{i=1}^{K} D_i^r D_i^n}{\sqrt{\sum_{i=1}^{K}(D_i^r)^2}\sqrt{\sum_{i=1}^{K}(D_i^n)^2}}\right] \quad (8)$$

The closer the distance $Dist_{CS}(ET_r, ET_n)$ is to zero, the closer the event-type distributions $ET_r$ and $ET_n$ are to each other. The closer the distance $Dist_{CS}(ET_r, ET_n)$ is to one, the farther distributions $ET_r$ and $ET_n$ d are from each other. In another implementation, the distance between event-type distributions may be computed using Jensen-Shannon divergence:

$$Dist_{JS}(ET_r, ET_n) = -\sum_{i=1}^{K} M_i \log_2 M_i + \frac{1}{2}\left[\sum_{i=1}^{K} D_i^r \log_2 D_i^r + \sum_{i=1}^{K} D_i^n \log_2 D_i^n\right] \quad (9)$$

where $M_i=(D_i^r+D_i^n)/2$.

The Jensen-Shannon divergence ranges between zero and one and has the properties that the distributions $ET_r$ and $ET_n$ are similar the closer $Dist_{JS}(ET_r, ET_n)$ is to zero and are dissimilar the closer $Dist_{JS}(ET_r, ET_n)$ is to one. In the following discussion, the distance $Dist(ET_r, ET_n)$ represents the distance $Dist_{CS}(ET_r, ET_n)$ or the distance $Dist_{JS}(ET_r, ET_n)$.

The distance $Dist(ET_r, ET_n)$ is computed for N historical aberrations in the set of previously recorded KPI data. The distances are rank ordered from smallest to largest to identify the minimum distance (i.e., shortest distance) in the set of distances represented by:

$$Dist_{min}=\min\{Dist(ET_r, ET_1), Dist(ET_r, ET_2), \ldots, Dist(ET_r, ET_N)\} \quad (10)$$

When the minimum distance satisfies the condition:

$$Dist_{min} \leq Th_D \quad (11a)$$

where $Th_D$ is an event-type distribution threshold, the real-time aberration with event-type distribution $ET_r$ is identified as having the same problem type as the historical aberration with the event-type distribution $ET_n$ that gives $Dist(ET_r, ET_n)=Dist_{min}$. The real-time problem is remedied by applying the remedial action associated with the event-type distribution $ET_n$. On the other hand, when the minimum distance satisfies the condition:

$$Dist_{min} > Th_D \quad (11b)$$

the problem type of the real-time aberration is considered unknown and a second alert is generated indicating that the problem type is unknown. Additional investigation may be performed by an IT administrator to identify the problem and remedial action to remedy the problem. The event-type distribution, problem type, and remedial action taken by the IT administrator to remedy the problem are recorded in the corresponding historical record of KPI aberrations.

Figure 26:
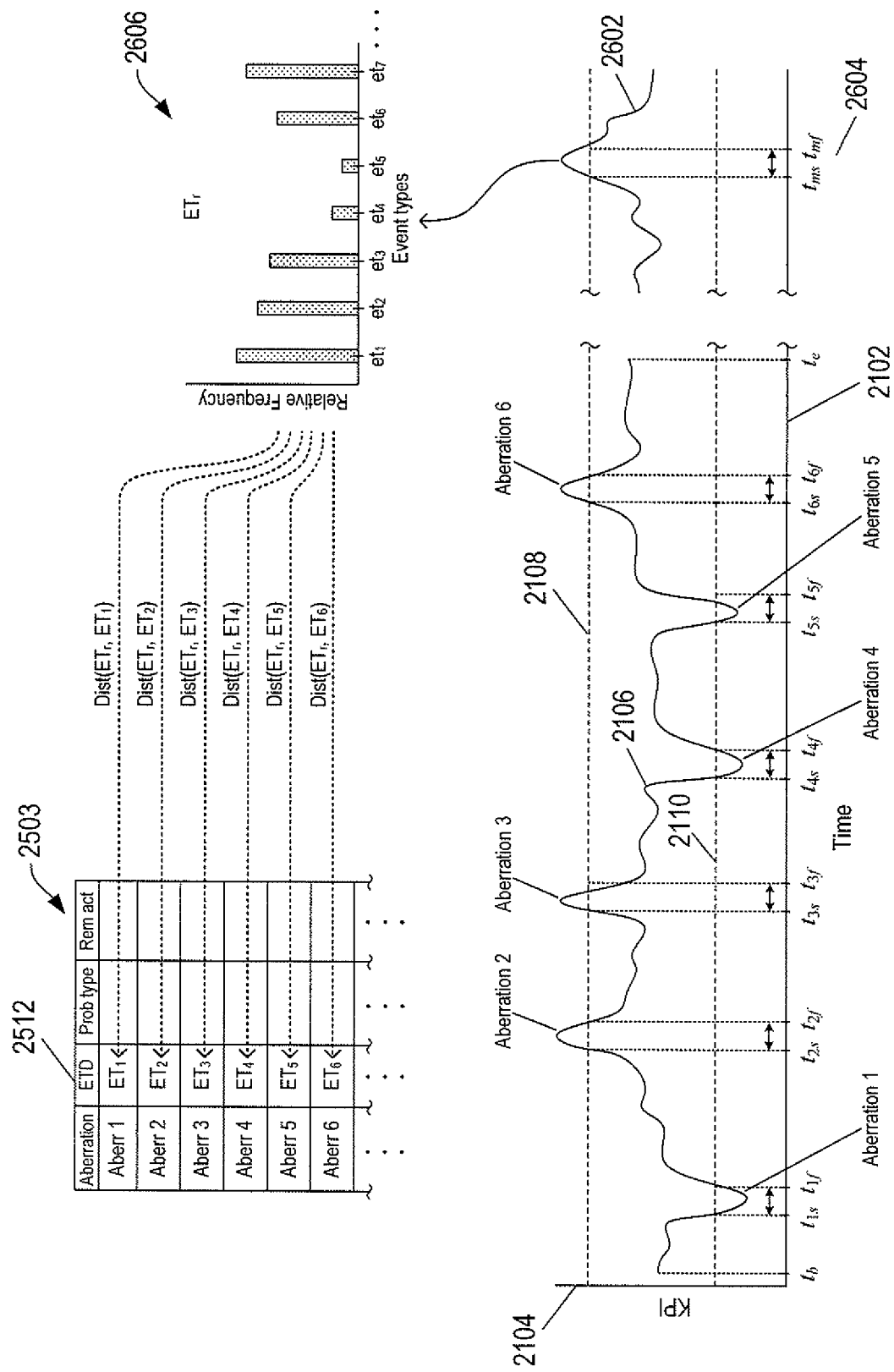
FIG. 26 shows an example of distances computed between an event-type distribution of a real-time aberration and the event-type distributions of historical aberrations for the previously recorded KPI data.

FIG. 26 shows an example of distances computed between an event-type distribution of a real-time aberration and the event-type distributions of historical aberrations for the previously recorded KPI data shown in FIG. 21. Curve 2602 represents current KPI data generated in real time with a violation of the upper KPI threshold 2108 occurring at start time $t_{ms}$. The threshold violation triggers an alert indicating in real time that the KPI is in an abnormal state. Event messages associated with the KPI are accumulated in a time window $[t_{ms}, t_{mf}]$ 2604, where $t_{ms}$ is the start time of the aberration and $t_{mf}=t_{ms}+t_w$ is the end time of the time window 2604. Event-type analysis described above with reference to FIG. 23 is applied to event messages generated by one or more event sources associated with the KPI and having time stamps in the time window $[t_{ms}, t_{mf}]$ to obtain an event-type distribution 2606. FIG. 26 shows the historical records 2503 of KPI data aberrations for the KPI data. A distance is computed between the event-type distribution 2606 and each of the event-type distributions listed in column 2512 of the historical record 2503. Suppose $Dist(ET_r, ET_4)$ 2608 is the minimum distance as described above with reference to Equation (10). When the minimum distance $Dist(ET_r, ET_4)$ satisfies the condition given by Equation (11a), the type of problem is identified as Problem type 1 and the remedial action Remedial action 1 is executed to correct the problem.

When the minimum distance $Dist(ET_r, ET_4)$ satisfies the condition given by Equation (11b), a second alert is generated indicating that the problem indicated by the first alert is unknown and further action is needed on the part of the IT administrator to correct the problem.

In another implementation, rather than relying on a minimum distance threshold, k-nearest neighbor historical event-type distributions to the real-time event-type distribution are considered. A distance is computed between the real-time event-type distribution and each of the historical event-type distributions as described above with reference to Equations (8) and (9). The distances are rank ordered. The k-nearest neighbor historical event-type distributions to the real-time event-type distribution have the k smallest distances of the rank order distances. The problem type with the largest number of historical event-type distributions of the k-nearest neighbor historical event-type distributions to the real-time event-type distribution is assigned to the real-time aberration and event-type distribution.

Figure 27:
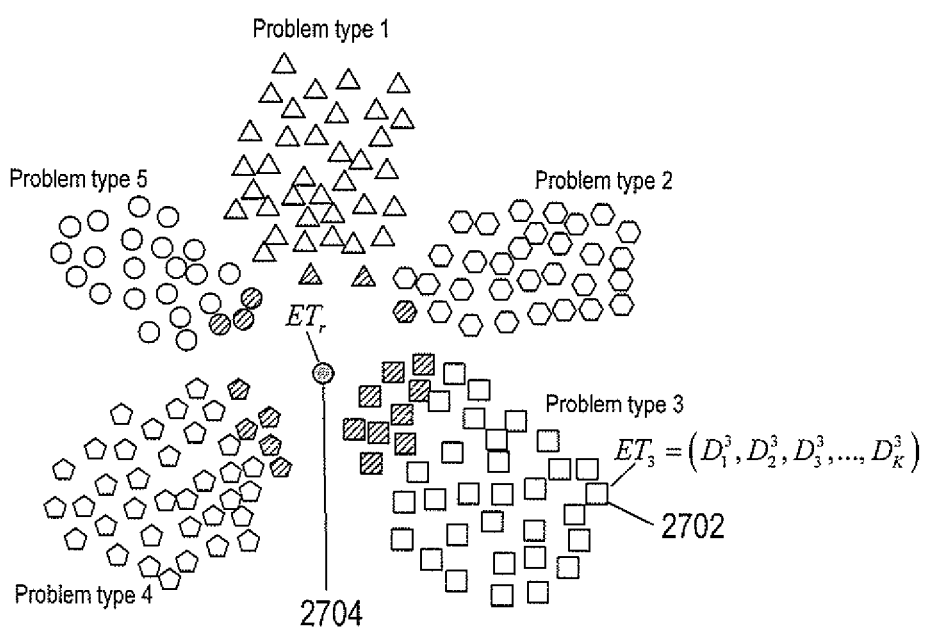
FIG. 27 shows an example K-dimensional space of historical event-type distributions associated with five different problem types.

FIG. 27 shows an example K-dimensional space of historical event-type distributions associated with five different problem types observed as historical aberrations in previously recorded KPI data. The historical event-type distributions associated with each problem type are represented by one of five differently shaped symbols. For example, square symbols represent different K-dimensional historical event-type distributions associated with problem type 3, such as square 2702 which represents a K-dimensional historical event-type distribution computed for a historical aberration in the previously recorded KPI data. Shaded circle 2704 represents a K-dimensional real-time event-type distribution computed as described above with reference to Equation 7. A distance is computed from the real-time event-type distribution 2704 to each of historical event-type distributions as described above with reference to Equations (8) and (9). In the example of FIG. 27, hash-marked shapes identify the twenty (k=20) nearest neighbor historical event-type distributions to the real-time event-type distribution 2704. Of the twenty nearest neighbor historical event-type distributions, Problem type 3 has the largest number of historical event-type distributions with nine of the twenty nearest neighbors to the real-time event-type distribution. As a result, the real-time aberration and corresponding event-type distribution 2704 is identified as Problem type 3.

In an alternative implementation, rather than storing each event-type distribution of each historical aberration of a set of KPI data, a representative historical event-type distribution associated with each problem type may be recorded instead, which reduces the amount of storage dedicated to storing the historical records of KPI aberrations. For example, in FIG. 25, rather than storing the event-type distributions $ET_1$ and $ET_4$, a representative historical event-type distribution can be stored for problem 1.

In one implementation, a representative historical event-type distribution may be computed as an average of the historical event-type distributions with the same problem type:

$$ET_{ave}^{(q)}(D_1^{(q)}, D_2^{(q)}, D_3^{(q)}, \ldots, D_K^{(q)}) \qquad (12)$$

where the average relative frequency is given by $$D_k^{(q)} = \frac{1}{N'} \sum_{n'}^{N'} D_k^{n'}$$

(q) represents problem type q;
N' is the number of event-type distributions of problem type q; and
n' is an event-type distribution index for problem type q.

In another implementation, a representative historical event-type distribution may be computed as the historical event-type distribution with a minimum average distance to the other historical event-type distributions of the same problem type. FIG. 28A shows a list of historical event-type distributions of the same problem type. FIG. 28B shows a matrix of distances computed between each historical event-type distribution and the other historical event-type distributions in FIG. 28A. The average distance of each historical event-type distribution from the other historical event-type distributions is located below each column and is computed as follows:

$$Dist^A(ET_{m'}) = \frac{1}{N'} \sum_{n'}^{N'} Dist(ET_{m'}, ET_{n'}) \qquad (13)$$

For example, column 2802 is a list of distances computed between the historical even-type distribution $ET_1$, and each of the historical event-type distributions $ET_{2'}$, $ET_{3'}$, and $ET_{N'}$. The average distance from the historical even-type distribution $ET_1$, to the other historical event-type distributions $ET_{2'}$, $ET_{3'}$, and $ET_{N'}$, is denoted by $Dist^A(ET_1)$. The minimum average distance is identified from the average distances:

$$\min\{Dist^A(ET_{1'}), Dist^A(ET_{2'}), \ldots, Dist^A(ET_{N'})\}$$

The historical event-type distribution with the minimum average distance is the representative historical event-type distribution for the problem type in the historical record of KPI aberrations.

The remedial actions listed in the historical record of KPI aberrations can be sets of computer instructions that are executed following identification of a particular problem type to remedy the problem. FIG. 29 shows examples of problem types and corresponding remedial actions. For example, when the real-time event-type distribution $ET_r$ is closest to the historical event-type distribution $ET_1$, the problem type is "insufficient server computer memory allocated to VM." The corresponding remedial action comprises a set of instructions that when executed on the server computer increases the amount memory available to the VM by a quantity y. When the real-time event-type distribution $ET_r$ is closest to the historical event-type distribution $ET_2$, the problem type is "insufficient server computer CPU allocated to VM." The corresponding remedial action comprises a set of instructions that when executed on the server computer increases the amount available CPU to the VM by a quantity z. When the real-time event-type distribution $ET_r$ is closest to either of the historical event-type distributions $ET_3$ and $ET_4$, the problem types are insufficient server computer CPU and memory, respectively. The corresponding remedial actions comprise instructions that when executed searches for a server computer with enough CPU or memory to satisfy the demands of the VM and allows to a user to migrate the VM from the current server computer to the identified server computer with enough CPU or memory.

Figure 30:
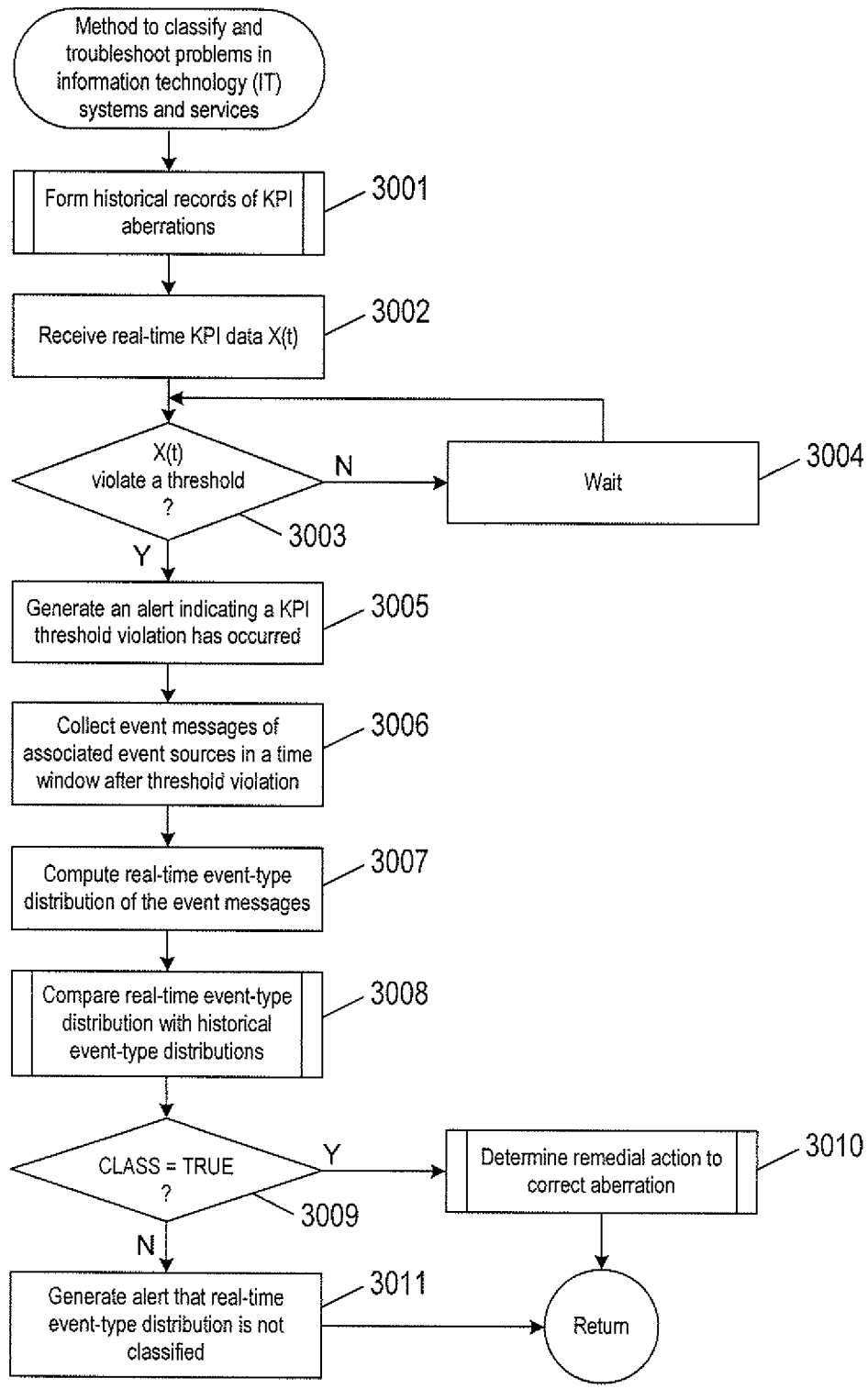
FIG. 30 shows a control-flow diagram of a method to classify and troubleshoot problems in IT systems and services.

FIG. 30 shows a control-flow diagram of a method to classify and troubleshoot problems in IT systems and services. The method is stored in a computer readable medium as machine readable instructions and executed on the computer system described above with reference to FIG. 1. In block 3001, a routine "form historical records of KPI aberrations" is called. In block 3002, real-time KPI data is computed as described above with reference to Equation (1a)-(1d). The KPI data may be used to monitor compliance with a SLO of an SLA, as described above. In decision block 3003, when one or more data points of the real-time KPI data violates an associated KPI threshold an aberration is detected in the real-time KPI data and control flows to block 3005. Otherwise, control flows to block 3004. In block 3004, wait for a next real-time KPI data point to be generated. In block 3005, an alert is generated in response to the KPI threshold violation. The alert is displayed in a management interface of IP administration console identifying the KPI. In block 3006, event messages generated by event sources associated with the KPI are collected in a time window that begins at the start time of the KPI threshold violation. In block 3007, a real-time event-type distribution is computed from the event messages collected in the time window, as described above with reference to FIG. 23. In block 3008, a routine "compare real-time event-type distribution with historical event-type distributions" is called to compare the real-time event-type distribution with historical event-type distributions and identify a problem type of the real-time event-type distribution as the problem type of a historical event-type distribution closest to the real-time event-type distribution. When the problem type is identified, the routine assigns a variable "CLASS" the value "TRUE." When the problem type is unknown, the routine assigns the variable "CLASS" the value "FALSE." In decision block 3009, when the variable "CLASS" equals "TRUE," control flow to block 3010. Otherwise, control flows to block 3011. In block 3010, a routine "determine remedial action to correct aberration" is called. In block 3011, an alert is generated indicating that a problem type for the real-time event-type distribution is unknown.

Figure 31:
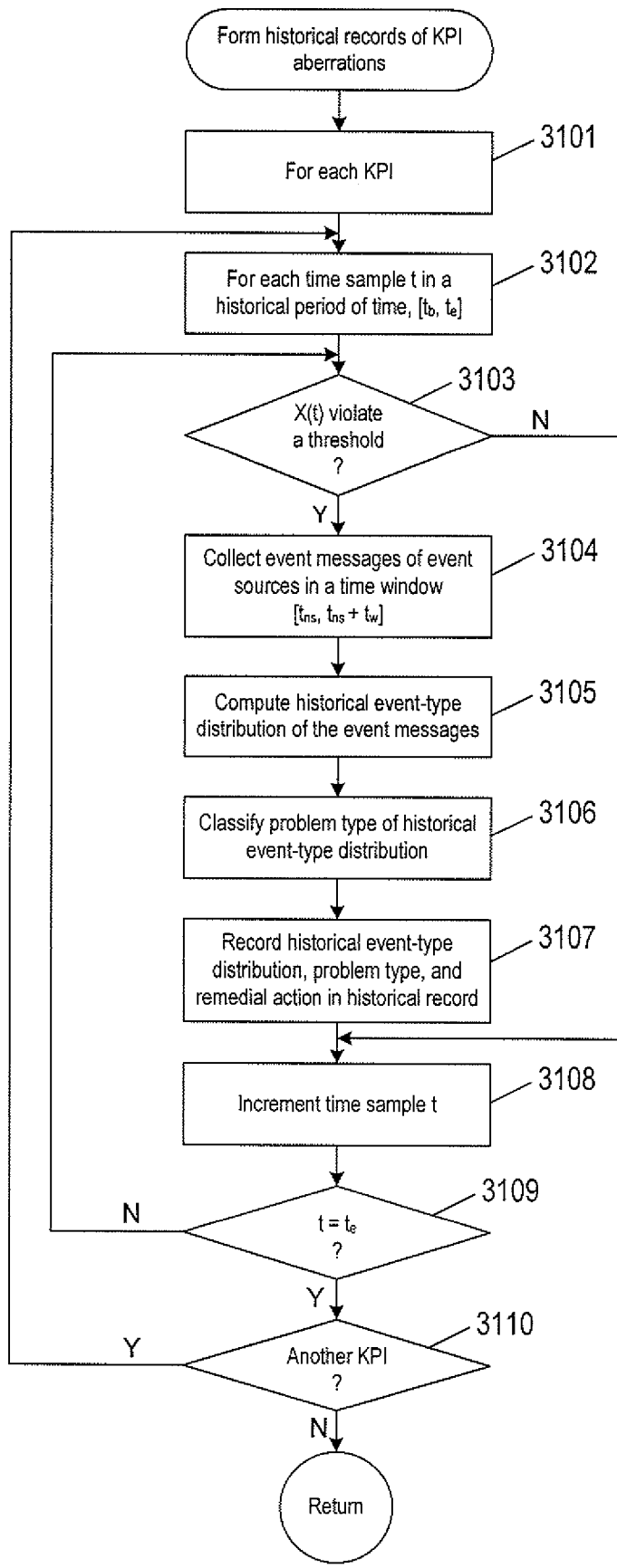
FIG. 31 shows a control-flow diagram of the routine "form historical records of KPI aberration" called in FIG. 30.

FIG. 31 shows a control-flow diagram of the routine "form historical records of KPI aberrations" called in block 3001 of FIG. 30. A loop beginning with block 3101 repeats the operations represented by blocks 3101-3110 for each set of KPI data. A loop beginning with block 3102 repeats the operations represented by blocks 3102-3109 for each time sample in a historical period of a set of KPI data. In decision block 3103, when a data point of the KPI data violates a KPI threshold as described above with reference to Equations (2a), (2b), and (3), control flows to block 3104. In block 3104, event messages generated by one or more event sources associated with the IT system or service monitored by the KPI data and recorded in a time window that begins when the threshold violation occurs are determined as described above with reference to FIG. 22. In block 3105, a historical event-type distribution is computed from the event messages as described above with reference to FIG. 23. In block 3106, the historical even-type distributions are classified as representing a particular problem type as described above with reference to FIG. 25. In block 3107, the historical event-type distribution, problem type, and remedial action taken to remedy the problem are recorded in the historical record of KPI aberrations. In block 3108, the time sample is incremented. In decision block 3109, when the time sample t equals the end time $t_e$ of the historical period of time, control flows to decision block 3110. In decision block 3110, blocks 3102-3109 are repeated for another KPI.

Figure 32:
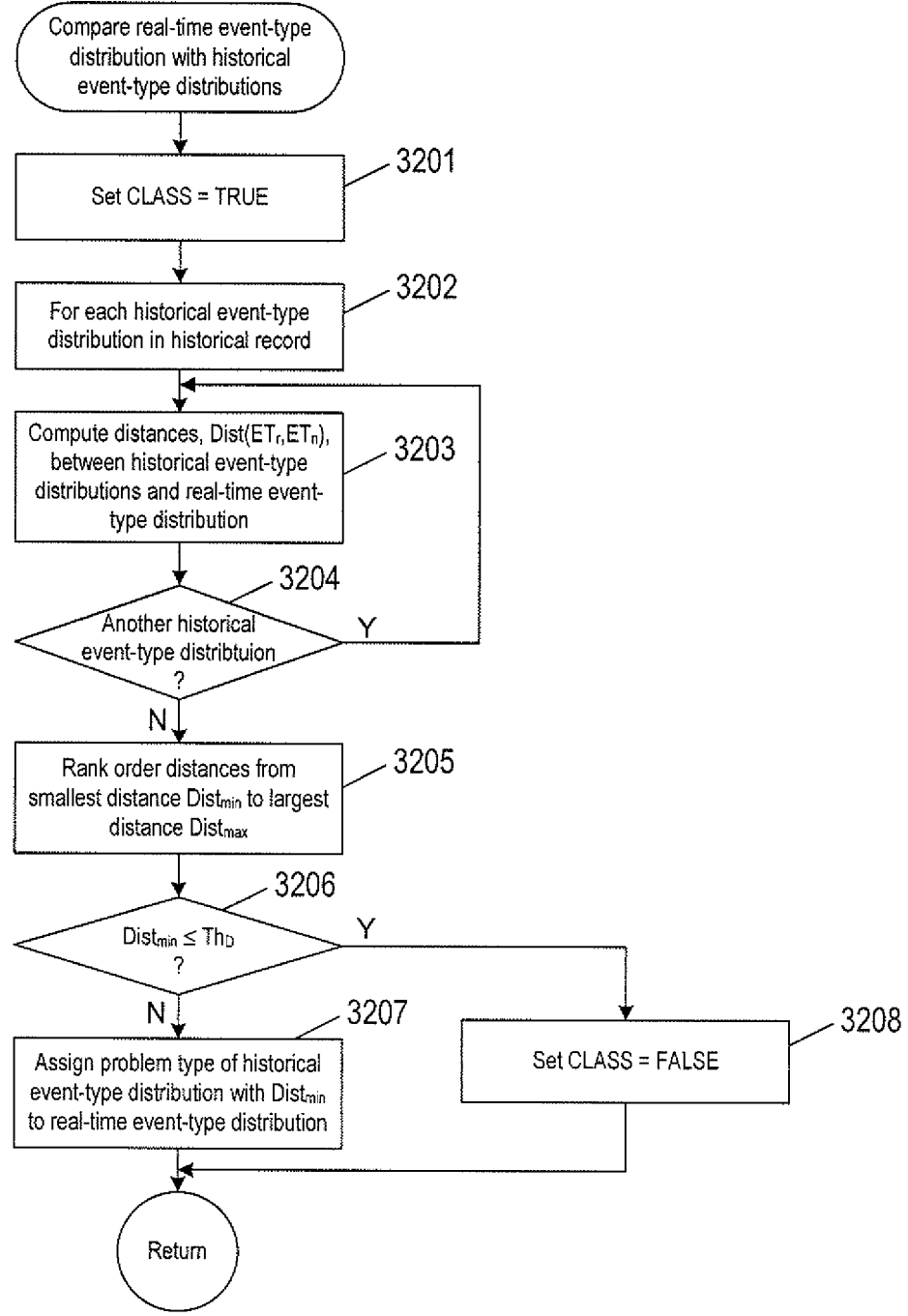
FIG. 32 shows a control-flow diagram of a routine "classify real-time aberration based on real-time event-type distribution and historical event-type distribution" called in FIG. 30.

FIG. 32 shows a control-flow diagram of a routine "classify real-time aberration based on real-time event-type distribution and historical event-type distribution" called in block 3008 of FIG. 30. In block 3201, the variable "CLASS" is initialized to "FALSE." A loop beginning with block 3202 repeats operations represented by blocks 3203 and 3204 for each historical event-type distribution in the historical record of KPI aberrations. In block 3203, a distance is computed between the real-time event-type distribution and a historical event-type distribution as described above with reference to Equations (8) and (9). In decision block 3204, when the historical event-type distributions have been considered, control flows to block 3205. In block 3205, the distances computed in blocks 3202-3204 are rank order from smallest distance to largest distance and the minimum distance, $Dist_{min}$, is identified as described above with reference to Equation (10). In decision block 3206, when the minimum distance $Dist_{min}$ satisfies the condition given by the condition in Equation (11a), control flows to block 3207. Otherwise, control flows to block 3208. In block 3207, the problem type of the historical event-type distribution with the minimum distance to the real-time event type distribution $Dist_{min}$ is assigned to the real-time event-type distribution. In block 3208, the variable "CLASS" is assigned the value "FALSE."

Figure 33:
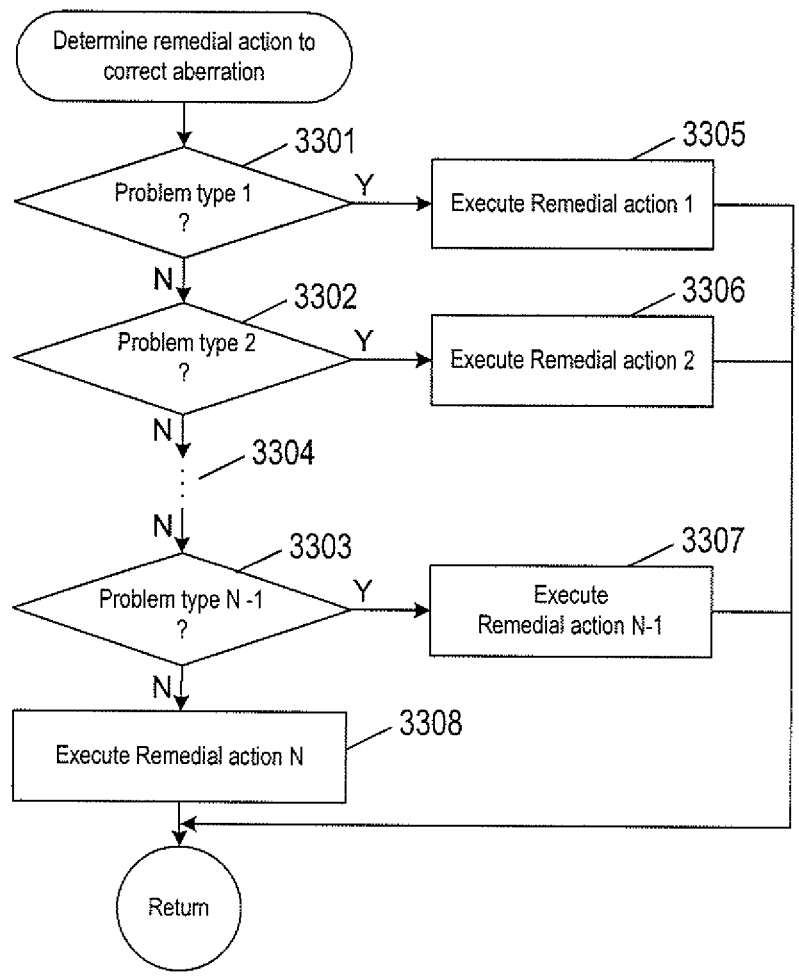
FIG. 33 shows a control-flow diagram of the routine "determine remedial action to correct aberration" called in FIG. 30.

FIG. 33 shows a control-flow diagram of the routine "determine remedial action to correct aberration" called in block 3010 of FIG. 30. In decision blocks 3301-3303, when the problem type assigned to the real-time event-type distribution matches one of the N−1 problem types, control flows to a corresponding block 3305-3307. Ellipsis 3304 represents problem types between Problem type 2 and Problem type N−1. In blocks 3305-3308, the corresponding remedial action is executed as described above with reference to FIG. 28.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated method stored in one or more data-storage devices and executed using one or more processors of a management server computer of a distributed computing system to classify and troubleshoot problems in information technology ("IT") systems or services, the method comprising:

generating an alert when real-time key performance indicator ("KPI") data used to monitor an IT system or service violates a KPI threshold, the KPI threshold violation indicating a problem in the IT system or service;

determining a real-time event-type distribution from event messages generated by event sources associated with the IT system or service;

comparing the real-time event-type distribution with historical event-type distributions recorded in a historical record of KPI aberrations in previously recorded KPI data of the IT system or service to identify a problem type of a historical event-type distribution closest to the real-time event-type distribution; and when the problem type is identified, determining a remedial action associated with the problem type that when executed remedies a problem identified by the problem type.

2. The method of claim 1 further comprising:
determining start times of each KPI threshold violation in the previously recorded KPI data;
identifying event messages generated by the event sources in time windows that begin at the start times;
determining a historical event-type distribution for the event messages in each of the time windows; and
recording the problem type and the remedial action for each historical event-type distribution in the historical record of KPI aberrations.

3. The method of claim 2 further comprising:
averaging two or more historical event-type distributions with a same problem type in the historical record of KPI aberrations; and
replacing the two or more historical event-type distributions in the historical record of KPI aberrations with the average of the two or more historical event-type distributions.

4. The method of claim 2 further comprising:
computing a distance between each pair of historical event-type distributions with a same problem type in the historical record of KPI aberrations;
determining an average distance of each historical event-type distribution to the other historical event-type distributions with the same problem type;
determining the historical event-type distribution with a minimum average distance to the other historical event-type distributions with the same problem type; and
replacing the historical event-type distributions with the same problem type in the historical record of KPI aberrations with the historical event-type distributions with the minimum of average distance.

5. The method of claim 1 wherein determining the real-time event-type distribution comprises:
determining a start time of the KPI threshold violation in the real-time KPI data;
identifying event messages generated by the event sources in a time window that begins at the start time; and
computing the real-time event-type distribution from the event messages in the time window.

6. The method of claim 1 wherein comparing the real-time event-type distribution with the historical event-type distributions comprises:
computing a distance between the real-time event-type distribution and each historical event-type distribution recorded in the historical record of KPI aberrations;
rank ordering the distances from a smallest distance to a largest distance;
when the smallest distance is less than an event-type distance threshold,
identifying a problem type of the historical event-type distribution with the smallest distance to the real-time event-type distribution, and
assigning the problem type to the real-time event-type distribution; and
when the smallest distance is greater than the distance threshold, generating an alert indicating that the problem type cannot be assigned to the real-time event-type distribution.

7. The method of claim 1 wherein comparing the real-time event-type distribution with the historical event-type distributions comprises:
computing a distance between the real-time event-type distribution and each historical event-type distribution recorded in the historical record of KPI aberrations;
rank ordering the distances from a smallest distance to a largest distance;
determining k-nearest neighbor historical event-type distributions to the real-time event-type distribution, the k-nearest neighbor historical event-type distributions having the k-smallest distances to the real-time event-type distribution; and
assigning a problem type of a largest number of historical event-type distributions of the k-nearest neighbor historical event-type distributions to the real-time event-type distribution.

8. The method of claim 1 wherein determining the remedial action to remedy the problem based on the problem type comprises identifying the remedial action associated with the problem type in the historical record of KPI aberrations, the remedial action including instructions that when executed remedy the problem.

9. A system to classify and troubleshoot problems in information technology systems and services, the system comprising:
one or more processors;
one or more data-storage devices; and
machine-readable instructions stored in the one or more data-storage devices that when executed using the one or more processors control the system to perform operations comprising:
generating an alert when real-time key performance indicator ("KPI") data used to monitor an IT system or service violates a KPI threshold, the KPI threshold violation indicating a problem in the IT system or service;
determining a real-time event-type distribution from event messages generated by event sources associated with the IT system or service;
comparing the real-time event-type distribution with historical event-type distributions recorded in a historical record of KPI aberrations in previously recorded KPI data of the IT system or service to identify a problem type of a historical event-type distribution closest to the real-time event-type distribution; and
when the problem type is identified, determining a remedial action associated with the problem type that when executed remedies the problem identified by the problem type.

10. The system of claim 9 further comprising:
determining start times of each KPI threshold violation in the previously recorded KPI data;
identifying event messages generated by the event sources in time windows that begin at the start times;
determining a historical event-type distribution for the event messages in each of the time windows; and
recording the problem type and the remedial action for each historical event-type distribution in the historical record of KPI aberrations.

11. The system of claim 10 further comprising:
averaging two or more historical event-type distributions with a same problem type in the historical record of KPI aberrations; and
replacing the two or more historical event-type distributions in the historical record of KPI aberrations with the average of the two or more historical event-type distributions.

12. The system of claim 10 further comprising:
computing a distance between each pair of historical event-type distributions with a same problem type in the historical record of KPI aberrations;

determining an average distance of each historical event-type distribution to the other historical event-type distributions with the same problem type;
determining the historical event-type distribution with a minimum average distance to the other historical event-type distributions with the same problem type; and
replacing the historical event-type distributions with the same problem type in the historical record of KPI aberrations with the historical event-type distributions with the minimum average distance.

13. The system of claim 9 wherein determining the real-time event-type distribution comprises:
determining a start time of the KPI threshold violation in the real-time KPI data;
identifying event messages generated by the event sources in a time window that begins at the start time; and
computing the real-time event-type distribution from the event messages in the time window.

14. The system of claim 9 wherein comparing the real-time event-type distribution with the historical event-type distributions comprises:
computing a distance between the real-time event-type distribution and each historical event-type distribution recorded in the historical record of KPI aberrations;
rank ordering the distances from a smallest distance to a largest distance;
when the smallest distance is less than an event-type distance threshold,
identifying a problem type of the historical event-type distribution with the smallest distance to the real-time event-type distribution, and
assigning the problem type to the real-time event-type distribution; and
when the smallest distance is greater than the distance threshold, generating an alert indicating that the problem type cannot be assigned to the real-time event-type distribution.

15. The system of claim 9 wherein comparing the real-time event-type distribution with the historical event-type distributions comprises:
computing a distance between the real-time event-type distribution and each historical event-type distribution recorded in the historical record of KPI aberrations;
rank ordering the distances from a smallest distance to a largest distance;
determining k-nearest neighbor historical event-type distributions to the real-time event-type distribution, the k-nearest neighbor historical event-type distributions having the k-smallest distances to the real-time event-type distribution; and
assigning a problem type of a largest number of historical event-type distributions of the k-nearest neighbor historical event-type distributions to the real-time event-type distribution.

16. The system of claim 9 wherein determining the remedial action to remedy the problem based on the problem type comprises identifying the remedial action associated with the problem type in the historical record of KPI aberrations, the remedial action including instructions that when executed remedy the problem.

17. A non-transitory computer-readable medium encoded with machine-readable instructions that implement a method carried out by one or more processors of a computer system to perform operations comprising:
generating an alert when real-time key performance indicator ("KPI") data used to monitor an IT system or service violates a KPI threshold, the KPI threshold violation indicates a problem in the IT system or service;
determining a real-time event-type distribution from event messages generated by event sources associated with the IT system or service;
comparing the real-time event-type distribution with historical event-type distributions recorded in a historical record of KPI aberrations in previously recorded KPI data of the IT system or service to identify a problem type of a historical event-type distribution closest to the real-time event-type distribution; and
when the problem type is identified, determining a remedial action associated with the problem type that when executed remedies the problem identified by the problem type.

18. The medium of claim 17 further comprising:
determining start times of each KPI threshold violation in the previously recorded KPI data;
identifying event messages generated by the event sources in time windows that begin at the start times;
determining a historical event-type distribution for the event messages in each of the time windows; and
recording the problem type and the remedial action for each historical event-type distribution in the historical record of KPI aberrations.

19. The medium of claim 18 further comprising:
averaging two or more historical event-type distributions with a same problem type in the historical record of KPI aberrations; and
replacing the two or more historical event-type distributions in the historical record of KPI aberrations with the average of the two or more historical event-type distributions.

20. The medium of claim 18 further comprising:
computing a distance between each pair of historical event-type distributions with a same problem type in the historical record of KPI aberrations;
determining an average distance of each historical event-type distribution to the other historical event-type distributions with the same problem type;
determining the historical event-type distribution with a minimum average distance to the other historical event-type distributions with the same problem type; and
replacing the historical event-type distributions with the same problem type in the historical record of KPI aberrations with the historical event-type distributions with the minimum average distance.

21. The medium of claim 17 wherein determining the real-time event-type distribution comprises:
determining a start time of the KPI threshold violation in the real-time KPI data;
identifying event messages generated by the event sources in a time window that begins at the start time; and
computing the real-time event-type distribution from the event messages in the time window.

22. The medium of claim 17 wherein comparing the real-time event-type distribution with the historical event-type distributions comprises:
computing a distance between the real-time event-type distribution and each historical event-type distribution recorded in the historical record of KPI aberrations;
rank ordering the distances from a smallest distance to a largest distance;
when the smallest distance is less than an event-type distance threshold, identifying a problem type of the historical event-type distribution with the smallest distance to the real-time event-type distribution, and assigning the problem type to the real-time event-type distribution; and when the smallest distance is greater than the distance threshold, generating an alert indicating that the problem type cannot be assigned to the real-time event-type distribution.

23. The medium of claim 17 wherein comparing the real-time event-type distribution with the historical event-type distributions comprises:

computing a distance between the real-time event-type distribution and each historical event-type distribution recorded in the historical record of KPI aberrations;

rank ordering the distances from a smallest distance to a largest distance;

determining k-nearest neighbor historical event-type distributions to the real-time event-type distribution, the k-nearest neighbor historical event-type distributions having the k-smallest distances to the real-time even-type distribution; and assigning a problem type of a largest number of historical event-type distributions of the k-nearest neighbor historical event-type distributions to the real-time event-type distribution.

24. The medium of claim 17 wherein determining the remedial action to remedy the problem based on the problem type comprises identifying the remedial action associated with the problem type in the historical record of KPI aberrations, the remedial action including instructions that when executed remedy the problem.

* * * * *